US012576530B2

(12) United States Patent　　(10) Patent No.: US 12,576,530 B2
　　Graabæk et al.　　　　　　　(45) Date of Patent: Mar. 17, 2026

(54) ROBOT SYSTEM FOR ANOMALY DETECTION

(71) Applicant: Universal Robots A/S, Odense (DK)

(72) Inventors: Søren Goddiksen Graabæk, Odense (DK); Andreas Rune Fugl, Årslev (DK); Emil Vincent Ancker, Odense (DK)

(73) Assignee: Universal Robots A/S, Odense (DK)

( * ) Notice: Subject to any disclaimer, the term of this patent is extended or adjusted under 35 U.S.C. 154(b) by 0 days.

(21) Appl. No.: 18/682,581

(22) PCT Filed: Aug. 10, 2022

(86) PCT No.: PCT/DK2022/050165
§ 371 (c)(1),
(2) Date: Feb. 9, 2024

(87) PCT Pub. No.: WO2023/016616
PCT Pub. Date: Feb. 16, 2023

(65) Prior Publication Data
US 2024/0351209 A1　　Oct. 24, 2024

(30) Foreign Application Priority Data

Aug. 13, 2021　(DK) ........................... PA 2021 70405
Aug. 13, 2021　(DK) ........................... PA 2021 70406

(51) Int. Cl.
*B25J 9/16*　　　　(2006.01)
*G06N 20/00*　　　(2019.01)

(52) U.S. Cl.
CPC ........... *B25J 9/1674* (2013.01); *B25J 9/1661* (2013.01); *G06N 20/00* (2019.01)

(58) Field of Classification Search
CPC ....... G06N 20/00; B25J 9/1661; B25J 9/1674; G05B 23/024; G05B 2219/42271
See application file for complete search history.

(56) References Cited

U.S. PATENT DOCUMENTS 4,763,531 A　　8/1988　Dietrich et al.
10,399,232 B2　9/2019　Oestergaard et al.
(Continued)

FOREIGN PATENT DOCUMENTS

CN　　　107957719 A　　4/2018
DE　102018203234 A1　9/2019
(Continued)

OTHER PUBLICATIONS

Wang et al., New fault tolerant robotic central controller for space robot system based on ARM processor, 2008, IEEE, p. 1-5 (Year: 2008).*

(Continued)

*Primary Examiner* — Mcdieunel Marc
(74) *Attorney, Agent, or Firm* — ArentFox Schiff LLP

(57) ABSTRACT

The invention relates to a robot system for detection of an operation anomaly. The robot system comprises: an industrial robot; a robot controller configured to control operation of said industrial robot; a robot operation program which is executable by said robot controller to operate said industrial robot according to a robot operation cycle; respective program nodes integrated in said robot operation program, wherein each of said respective program nodes is associated with a separate operational element of said robot operation cycle; wherein said robot controller is configured to obtain reference data based on operation parameters associated with execution of said robot operation program; and an anomaly detection block which for at least one of said respective program nodes is configured to evaluate an operation anomaly of said robot operation parameters relative to a representation of said reference data.

33 Claims, 9 Drawing Sheets

(56) References Cited

U.S. PATENT DOCUMENTS

| | | | |
|---|---|---|---|
| 10,636,260 B1 * | 4/2020 | Young ................... A63F 13/285 |
| D895,704 S | 9/2020 | Johansen |
| D895,705 S | 9/2020 | Johansen |
| D895,706 S | 9/2020 | Johansen |
| D898,090 S | 10/2020 | Johansen |
| 10,850,393 B2 | 12/2020 | Oestergaard et al. |
| D915,487 S | 4/2021 | Sell |
| D924,228 S | 7/2021 | Mirth |
| D932,485 S | 10/2021 | Mirth |
| D932,486 S | 10/2021 | Mirth |
| D932,487 S | 10/2021 | Mirth |
| 11,260,543 B2 | 3/2022 | Johansen |
| 11,474,510 B2 | 10/2022 | Oestergaard et al. |
| 11,796,045 B2 | 10/2023 | Johansen |
| 11,839,979 B2 | 12/2023 | Rosenlund et al. |
| 11,964,389 B2 | 4/2024 | Johansen |
| 12,011,824 B2 | 6/2024 | Vraa et al. |
| 12,128,566 B2 * | 10/2024 | Suresh ................... B25J 9/1633 |
| 2013/0079928 A1 | 3/2013 | Søe-Knudsen et al. |
| 2013/0231778 A1 | 9/2013 | Oestergaard et al. |
| 2013/0255426 A1 | 10/2013 | Kassow et al. |
| 2015/0204742 A1 | 7/2015 | Draisey |
| 2019/0098035 A1 | 3/2019 | Periaswamy et al. |
| 2020/0089209 A1 | 3/2020 | Amemiya |
| 2020/0171658 A1 | 6/2020 | Kielsholm |
| 2021/0086374 A1 | 3/2021 | Brandt et al. |
| 2021/0116901 A1 | 4/2021 | Yokoya et al. |
| 2021/0170590 A1 | 6/2021 | Laftchiev et al. |
| 2021/0240167 A1 | 8/2021 | Kang et al. |
| 2021/0260757 A1 | 8/2021 | Nielsen et al. |
| 2021/0260759 A1 | 8/2021 | Knudsen et al. |
| 2022/0161433 A1 | 5/2022 | Beck et al. |
| 2022/0184810 A1 | 6/2022 | Beck et al. |
| 2022/0226993 A1 | 7/2022 | Madsen |
| 2022/0379463 A1 | 12/2022 | Hansen |
| 2022/0379468 A1 | 12/2022 | Hansen |
| 2022/0388156 A1 | 12/2022 | Hansen |
| 2023/0035296 A1 | 2/2023 | Søe-Knudsen et al. |
| 2023/0052996 A1 | 2/2023 | Thomsen |
| 2023/0085100 A1 * | 3/2023 | Akey ................... B25J 11/0055 |
| | | 83/39 |
| 2023/0191603 A1 | 6/2023 | Thomsen et al. |
| 2023/0405819 A1 | 12/2023 | Kravchenko et al. |
| 2023/0405822 A1 | 12/2023 | Kravchenko et al. |
| 2023/0418258 A1 | 12/2023 | Mirth |
| 2024/0261909 A1 * | 8/2024 | Akey ................... B25J 11/005 |

FOREIGN PATENT DOCUMENTS

| | | | |
|---|---|---|---|
| DK | 202170406 A1 | 6/2023 |
| EP | 1168126 A1 | 1/2002 |
| EP | 3623951 A1 | 3/2020 |
| EP | 3831553 A1 | 6/2021 |
| JP | 2019-136838 A | 8/2019 |
| WO | 2014110682 A1 | 7/2014 |
| WO | 2019/057356 A1 | 3/2019 |
| WO | 2020/061699 A1 | 4/2020 |
| WO | 2021/001312 A1 | 1/2021 |

OTHER PUBLICATIONS

Wong et al., From High-Level Task Specification to Robot Operating System (ROS) Implementation, 2017, IEEE, p. 188-195 (Year: 2017).*

Park et al., Programmable Motion-Fault Detection for a Collaborative Robot, 2021, IEEE, p. 133123133142 (Year: 2021).*

Quarta et al., An Experimental Security Analysis of an Industrial Robot Controller, 2017, IEEE, p. 268-285 (Year: 2017).*

Buschhaus et al., Vector based closed-loop control methodology for industrial robots, 2015, IEEE, p. 1-7 (Year: 2015).*

Fernández-Jiménez et al., A Robot-Sensor Network Security Architecture for Monitoring Applications, 2021, IEEE, p. 6288-6304 ( Year: 2021).*

Guo et al., RoboADS: Anomaly Detection Against Sensor and Actuator Misbehaviors in Mobile Robots, 2021, IEEE, p. 574-585 ( Year: 2018).*

File History received for EP Application No. 22761405.4, downloaded on dated Dec. 20, 2024, 438 pages.

Saez, M. et al. "Context-Sensitive Modeling on Analysis of Cyber Physical Manufacturing Systems for Anomaly Detection and Diagnosis", IEEE Transaction on automation science and engineering, Available on internet at: https://ieeexplore.ieee.org/stamp/stamp.jsp?tp=&arnumber=8894669>, Jan. 2020, 12 pages.

Search Report and Opinion received for DK Patent Application No. PA202170426, mailed on Jan. 24, 2022, 10 pages.

Search Report and Written Opinion received for Danish Patent Application No. PA 202170405, mailed on Apr. 1, 2022, 9 pages.

Universal Robots., "User Manual UR3/CB3", Version 3.1, Jan. 1, 2009, 181 pages.

International Search Report and Written Opinion in Application No. PCT/DK2022/050165 dated Nov. 8, 2022, 16 pages.

Jiang et al., "Inferring and monitoring invariants in robotic systems," Autonomous Robots, Kluwer Academic Publishers, Dordrecht, NL, vol. 41, No. 4, (2016) pp. 1027-1046, 20 pages.

* cited by examiner

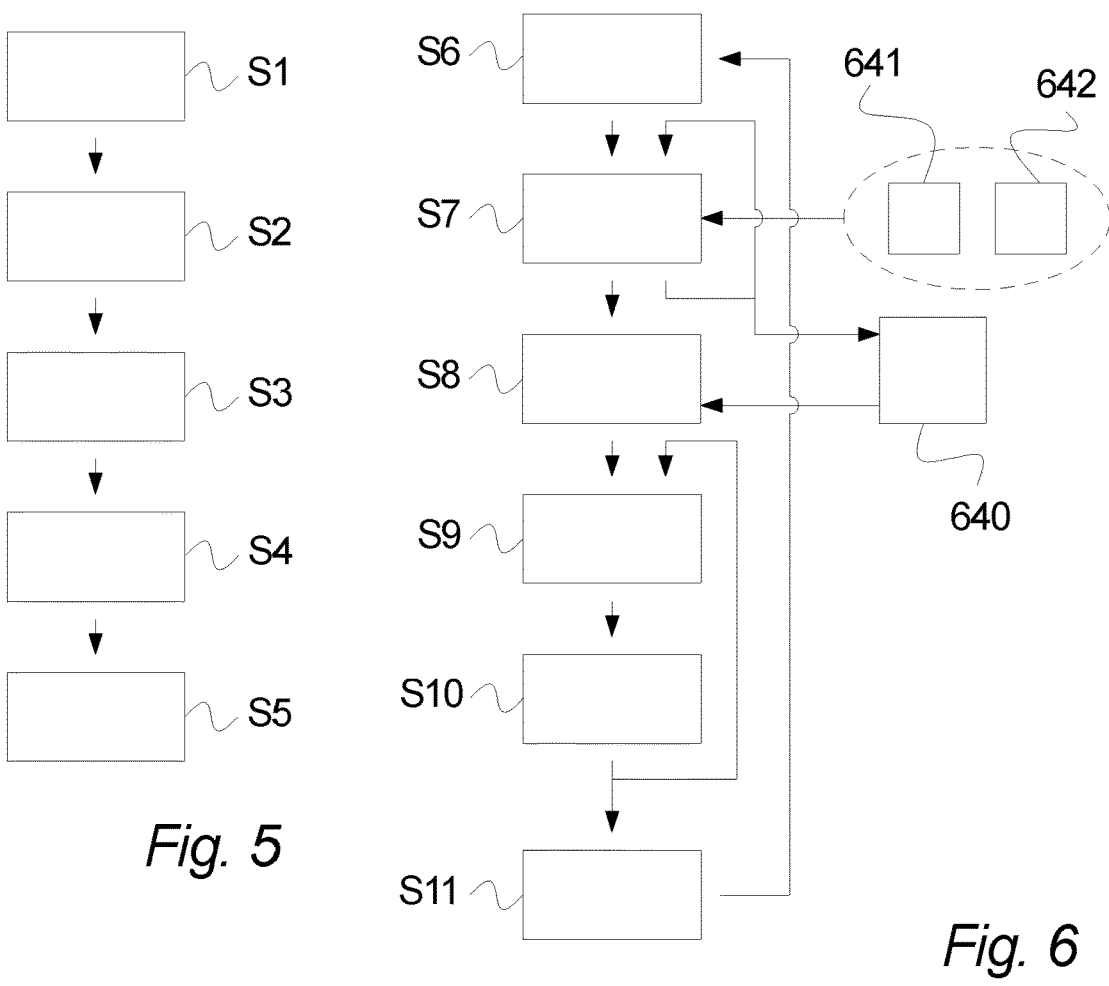
Fig. 5
Fig. 6
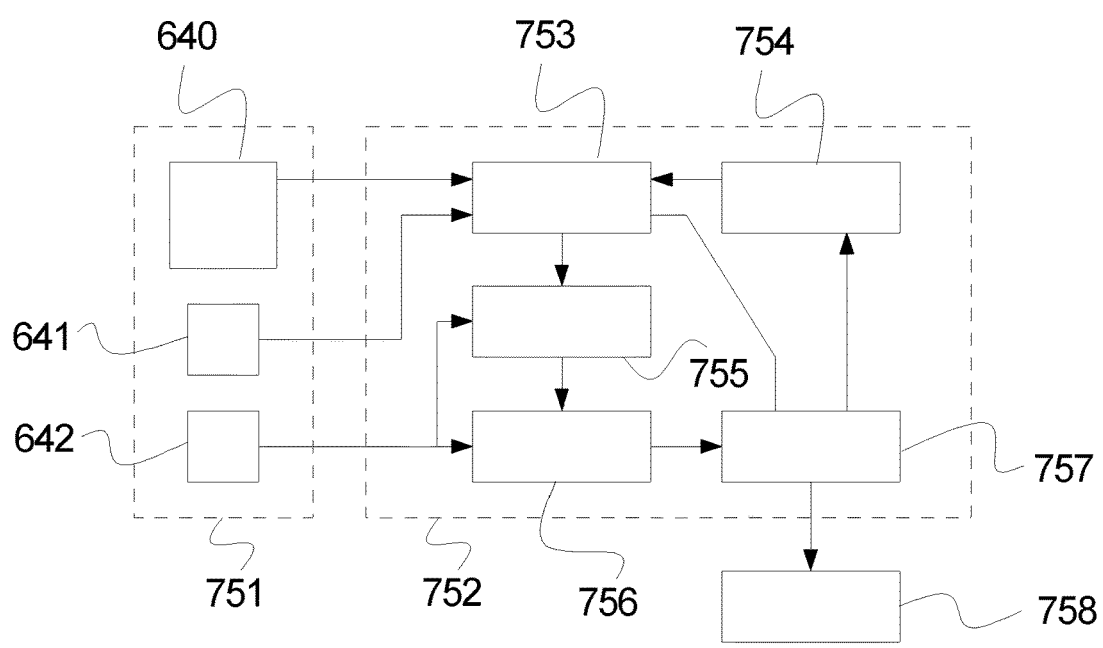
Fig. 7

ROBOT SYSTEM FOR ANOMALY DETECTION

CROSS-REFERENCE TO RELATED APPLICATIONS

This application is a national stage entry of PCT Application No. PCT/DK2022/050165, which was filed on Aug. 10, 2022. PCT Application No. PCT/DK2022/050165 claims priority to Denmark Patent Application Nos. PA202170405 and PA202170406, which were both filed on Aug. 13, 2021. This application claims priority to PCT Application No. PCT/DK2022/050165 and to Denmark Patent Application Nos. PA202170405 and PA202170406. The contents of PCT Application No. PCT/DK2022/050165 and of Denmark Patent Application Nos. PA202170405 and PA202170406 are incorporated herein by reference.

FIELD OF THE INVENTION

The present invention relates to a robot system and a method for detection of an operation anomaly of an industrial robot, such as a robot arm.

BACKGROUND OF THE INVENTION

Examples of industrial robots are robot arms and autonomous mobile robots. Robot arms comprising a plurality of robot joints and links where motors can move part of the robot arm in relation to each other are known in the field of robotics. Typically, the robot arm comprises a robot base which serves as a mounting base for the robot arm; and a robot tool flange where to various tools can be attached. A robot controller is configured to control the robot joints in order to move the robot tool flange in relation to the base. For instance, in order to instruct the robot arm to carry out a number of working instructions. The robot joints may be rotational robot joints configured to rotate parts of the robot arm in relation to each other, prismatic joints configured to translate parts of the robot arm in relation to each other and/or any other kind of robot joints configured to move parts of the robot arm in relation to each other.

Typically, the robot controller is configured to control the robot joints based on a dynamic model of the robot arm, where the dynamic model defines a relationship between the forces acting on the robot arm and the resulting accelerations of the robot arm. Often, the dynamic model comprises a kinematic model of the robot arm, knowledge about inertia of the robot arm and other parameters influencing the movements of the robot arm. The kinematic model defines a relationship between the different parts of the robot arm and may comprise information of the robot arm such as, length, size of the joints and links and can for instance be described by Denavit-Hartenberg parameters or like. The dynamic model makes it possible for the controller to determine which torques the joint motors shall provide in order to move the robot joints for instance at specified velocity, acceleration or in order to hold the robot arm in a static posture.

Typically, it is possible to attach various end effectors to the robot tool flange or other parts of the robot arm, such as grippers, vacuum grippers, magnetic grippers, screwing machines, welding equipment, dispensing systems, visual systems etc.

Robot arms are often programmed by a user or a robot integrator which defines various instructions for the robot arm, such as predefined moving patterns and working instructions such as gripping, waiting, releasing, screwing instructions. The instruction can be based on various sensors or input signals which typically provide a triggering signal used to stop or start a given instruction. The triggering signals can be provided by various indicators, such as safety curtains, vision systems, position indicators, etc.

Since industrial robots are often installed in unique applications by human integrators, the autonomous operation of the robots is prone to anomalies and errors. Furthermore, operation of industrial robots may involve vastly different operational elements. Typically, generally applicable anomaly conditions for the complex operational cycles of robots do not exist.

Within the field of robot data analysis, a large volume of simulation- and model-based anomaly detection methods exists. However, model- and simulation-based approaches require precise models and prior knowledge of the configuration of the robot system and/or industrial robot, environment, and the anomalies to be detected. Thus, relying on the model- and simulation-based approaches imposes an unwanted requirement on the anomaly detection framework's users. Furthermore, anomaly detection methods, requires a lot of processor power and memory, and thereby, performing anomaly detection of robots requires one or more controller dedicated to the anomaly detection. To avoid impact on the operation of industrial robot from such anomaly detection, such dedicated controllers are typically located external to the industrial robot.

SUMMARY OF THE INVENTION

The object of the present invention is to address the above-described limitations with the prior art or other problems of the prior art. This is achieved by the method, robot system, and computer program according to the independent claims where the dependent claims describe possible embodiments of the robot and methods according to the present invention.

An aspect of the invention relates to a robot system for detection of an operation anomaly, said robot system comprising:

an industrial robot; a robot controller configured to control operation of said industrial robot; a robot operation program which is executable by said robot controller to operate said industrial robot according to a robot operation cycle of said robot operation program; respective program nodes integrated in said robot operation program, wherein each of said respective program nodes is associated with a separate operational element of said robot operation cycle; wherein said robot controller (110) is configured to obtain reference data based on operation parameters associated with execution of said robot operation program; and an anomaly detection block which for at least one of said respective program nodes is configured to evaluate an operation anomaly of said robot operation parameters relative to a representation of said reference data.

A robot system comprising a robot controller capable of detecting an anomaly related to the operation of the robot is advantageous in that it has the effect that no additional external control/monitoring system is required. Thereby, the need for integration of such external system into the robot system is avoided as well as the expenses to such external system.

Typically, as a robot performs an industrial task, it goes through a robot operation cycle in which a series of tasks are performed, such as moving the robot between different positions, waiting, activating a tool, carrying a payload, etc. These different operational elements of the robot operation cycle may typically be prone to vastly different types of errors. For example, risk of collisions may be increased during movement, risk of the tool failure may increase while activating/applying the tool, or automated surroundings of the robot may fail to provide a workpiece while the robot is waiting. Furthermore, the criteria for when a deviation from an intended robot operation cycle is acceptable or unacceptable may vary for different operational elements, e.g. relatively large displacements or deviations may be acceptable while moving the robot from one position from another, while only relatively small displacements are typically acceptable while applying the tool.

A robot system according to the invention has node conditions associated with different respective program nodes, which relate to separate operational elements of the robot operation cycle. With this segmentation of conditions into respective conditions sets relating to separate operational elements, it may be possible to identify and isolate the operational element in which an anomaly occurs, which is advantageous, e.g. for trouble shooting.

Such identification of anomalies and the operational element in which they occur may further establish general teachings of robots and their robot operation programs, and, particularly, how respective program nodes and their associated operational elements should be designed to ensure a minimal number of anomalies. Thus, the invention may advantageously provide broadly applicable knowledge in relation to robots.

Furthermore, respective node condition sets may advantageously permit different conditions for different program nodes, which in turn may both permit finding smaller (yet critical) anomalies and reduce the number of false positive anomaly detections.

Moreover, respective node condition sets may advantageously reduce computational requirements, since anomaly detection can be focused on specific node conditions of specific operational elements.

Additionally, an anomaly detection scheme which is based on respective program nodes advantageously provides a flexible foundation for anomaly detecting in distinct applications of robots, since the respective program nodes may be used as building blocks for such distinct applications. For example, separate robots with separate applications such as machine tending, pick-and-place, welding, and buffing may each use anomaly detection according to the invention, which is advantageous.

The invention may further be utilized for detection of exogenous anomalies, which is advantageous. Particularly, different exogenous anomalies may occur during execution of different operational elements of a cycle, and hence, having respective node condition sets may advantageously facilitate detection of such errors.

An industrial robot may for example be understood as a robot arm or an autonomous mobile robot. A robot arm may be understood as a type of mechanical arm. It may typically have a number of robot joins and links where motors can move part of the arm in relation to another part of the arm. A robot arm may be controllable, e.g. by a programmable robot controller. Alternatively, an industrial robot may be an autonomous mobile robot, which is capable of performing mobile tasks such as product delivery. It may for example move via wheels.

A robot controller may be understood as a controller for controlling operation of the robot arm. It may typically comprise a processor and memory and may control the individual motors of the industrial robot, e.g. based on a robot operation program such that the robot moves according to the robot operation program. The robot controller may optionally facilitate the anomaly detection block. The anomaly detection block may for example be integrated as part of the memory and the processor of the robot controller.

A robot operation program may be understood as executable code or software, upon which the robot controller can control the industrial robot and motion of the industrial robot. In typical industrial tasks, execution of a robot operation program may typically be repeated again and again, since industrial robots are typically suitable for performing repetitive tasks/cycles. A single execution of a robot operation program may typically correspond to operation of the industrial robot according to a single robot operation cycle, which may then be repeated. Two robot operation cycles may not necessarily be identical. A robot operation program may for example be based on decision tree structure, in which different operations are performed based on which object the industrial robot encounters. Further, note that embodiments of the invention are not restricted to performing multiple operational cycles, but may for example just perform a single cycle.

The robot operation program may thus for example comprise instructions which are readable and executable by a computer and/or the robot controller, which upon execution on the robot controller cause the robot controller to operate the industrial robot according to the instructions.

A robot operation cycle may typically be built up from different operational elements such as movement, tool activation, waiting, and measuring. Such elements may be embodied in the robot operation program as program nodes, for example such that respective program nodes are associated with respective operational elements.

Examples of different applications in which an industrial robot may operate according to robot operation cycles are palletizing, stacking, machine tending, welding, screwing, buffing/polishing/grinding, deburring, picking and/or placing, inspecting, packing, product delivery, and cleaning. However, the invention is not restricted to these examples. Such various application may be established based on assembly of different program nodes. Program nodes may be understood as building blocks from which a robot operation program is built.

An operation anomaly may for example be understood as a deviation of robot operation parameters established in relation to operation of the industrial robot upon execution of the robot operation program and its respective program nodes. In other words, the robot operation parameters do not conform with the expected behavior of the robot system and its interactions with its surroundings. Thus, anomaly detection is typically not intended to detect noise, but the presence of noise may nevertheless result in an (incorrect) anomaly detection. Examples of operation anomalies are change in time in a to execute a step/respective program node, change in current to a motor, change in posture in a given point in space, etc. In the present context, the expected behavior of the robot system may be defined by a robot operation program executed by a robot controller controlling the robot operation. With this said, due to tolerances, change in objects to e.g. be handled by the robot operation system, peripheral devices, etc., even though the robot operation program is the same, robot operation parameters may change from cycle to cycle.

Examples of robot operation parameters are external sensor data, joint data, force-torque data, time in program node, states of input and/or output ports of the controller, etc.

Note that the invention is not restricted to these examples of robot operation parameters. Further, note that embodiments of the invention may optionally at least partially rely on robot operation parameters established in previous operation cycles of the robot system. For example, such parameters may serve as basis for establishment of node conditions. Thus, robot operation parameters as such are not necessarily restricted to a particular robot operation cycle.

To detect an anomaly, a condition for when a particular occurrence of robot operation parameters is typically required. A node condition may be understood as such a condition. However, in contrast to conventional solutions, a node condition is related to a particular node of the respective program nodes. An example of a node condition is a threshold, and if a robot operation parameter (or a set of robot operation parameters) exceed this threshold, an anomaly is detected. Another example is that a node condition is a threshold of an outlier score calculated by an anomaly detector.

According to the invention the respective program nodes are respectively associated with respective node condition sets. Each node condition set has at least one node condition, which then specify conditions for anomaly detection in relation to the associated program node. Note however that a node condition may be associated with more than one node. E.g. in a robot operation program with five respective program nodes, a first node condition relates to three separate nodes, and a second node condition relates to the two remaining nodes.

Note that anomaly detection according to the invention does not necessarily rely on knowledge of the type of anomaly to be detected. Typically (but not exclusively), the node conditions define or specify what may be interpreted as normal operation, i.e. operation without occurrence of any operation anomalies. For example, if robot operation parameters lie within these conditions (for example, if robot operation parameters or an anomaly detector's response lies within these conditions), no anomalies have occurred corresponding to normal operation. Exceeding or breaking a condition by a robot operation parameter then corresponds to an operation anomaly.

Note that embodiments of the invention do not necessarily detect an operation anomaly in each robot operation cycle but may have operation cycles without anomalies as well.

An anomaly detection block may be understood as circuitry configured to process the robot operation parameters and node condition sets to compare these, upon which an anomaly may be detected. An anomaly detection block may thus typically be based on a digital logic circuit such as a processor but may in principle also be facilitated by an analogue circuit, or a combination of digital and analogue circuitry. In an embodiment, the anomaly detection block is integrated in the robot controller. However, the anomaly detection block may also be implemented on a computer system external to the robot controller via a local connection, implemented on a separate external unit such as a programmable logic circuit or a field-programmable gate array, or be implemented via cloud computation and storage.

Operation anomaly (alternatively just referred to as anomaly) should in the context of the present invention at least include a deviation in data that do not conform with the expected behavior of the robot system and/or its surroundings, and which does not originate from noise. Hence, examples of an anomaly could include change in time spent to execute a step of the program sequence, change in current to a motor, change in posture in a given point in space, etc. In the present context, the expected behavior of the robot system may be defined by a robot operation program executed by a robot controller controlling the robot operation. With this said, due to tolerances, change in objects to e.g. be handled by the robot operation system, peripheral devices, etc., even though the robot operation program is the same, robot operation parameters may change from cycle to cycle.

Normal operation on the other hand should in the context of the present invention by understood as when the obtained robot operation data and the reference data is similar or at least does not deviate from the reference data or information derived therefrom more than allowed e.g. by a predefined value, percentage, threshold, or the like.

According to an embodiment of the invention, the robot system comprising respective node condition sets, wherein each of said respective node condition sets specifies at least one node condition respectively associated with each of said respective program nodes, According to an embodiment of the invention, said anomaly detection block is configured to compare said at least one node condition with one or more robot operation parameters established in relation to execution of said respective program nodes to detect said operation anomaly.

According to an embodiment of the invention, said robot controller is configured to establish reference data based on robot operation parameters obtained during operation of said industrial robot.

This is advantageous in that it has the effect, that the reference data and thereby normal operation of the industrial robot is defined by actual values of robot operation parameters that are obtained during operation of the industrial robot and thereby can be used as basis e.g. for comparing with subsequent obtained values of similar robot operation parameters.

According to an embodiment of the invention, two or more sets of reference data are established based on the same robot operation program.

Having two or more sets of reference data is advantageous in that it has the effect, that two or more sets of values of robot operation parameters can be considered normal operation of the robot arm also when the robot arm is operated according to the same robot operation program.

According to an embodiment of the invention, said anomaly detection block is established based on a learning-based anomaly detection method comprised by the list comprising: supervised, unsupervised, semi-supervised, and reinforcement learning.

Common for the supervised, unsupervised and semi-supervised learning-based anomaly detection methods is that they receive data as input and a score as output. The output scores can have many different interpretations: distance measures, density measures, direct probability estimates of being an outlier, etc. The output score can be converted into binary labels through a classifier. The classifiers can range from simple domain-specific thresholding to more complex classifiers.

According to an embodiment of the invention, said robot controller is configured to display to a user, via a user interface, the program node at which the anomaly occurred.

The information display to a user via the user interface, may be in the form of a video of the operation of said industrial robot coincident with the occurrence of the anomaly. Being able to provide a user with information of where in the program or a visual representation such as a video film of the operation of the robot during an anomaly is advantageous in that it has the effect, that root cause analysis and understanding of the anomaly in general is improved.

In an embodiment of the invention, said robot controller is configured to control operation of said industrial robot based on said internal operation parameters.

By using the same parameters for control and for anomaly detection, measurements and analysis of additional other parameters may be avoided, which is advantageous.

It should be mentioned that the robot operation parameters may also be based on internal operation parameters or only on internal operation parameters. By performing anomaly detection based on internal operation parameters, the anomaly detection can be performed without requiring additional external sensors, cameras, or other additional measurement devices, which is advantageous. Internal operation parameters may for example be understood as any parameters obtained by the industrial robot, e.g. by its own sensors. Internal operation parameters may further comprise parameters outputted by the robot controller, indicative of operation of the industrial robot. Internal operation parameters may also comprise interoceptive parameters. Examples of internal operation parameters are (actual and target) joint positions, joint velocities, joint currents, coordinates and orientation of the tool, temperatures, robot mode, tool mode, payload mass (as measured by the robot), etc. Furthermore, since such parameters are present in typical robots, use of these parameters permits a generic anomaly detection scheme which fits most applications, which is advantageous.

In an embodiment of the invention, said internal operation parameters comprises timestamp.

In an embodiment of the invention, said internal operation parameters comprise time in program node.

Time in program node indicate the time spend in a program node. Such a parameter may for example be relevant when the robot is waiting to receive an item or a workpiece. Time in program node can for instance be obtained based on timestamps or be obtained via a timing counter that is started once the program node is started. Irregular timings may advantageously indicate anomalies.

In an embodiment of the invention, at least one of said respective program nodes is exempt from comparison in said anomaly detection block.

Optionally, not all program nodes are subject to anomaly detection. For example, for the purpose of reducing required computational power. Or perhaps, operation within a particular program node is too irregular to permit meaningful anomaly detection. Also, anormal detection may in some program nodes may not be desired by the user, e.g. program nodes where anormal detection is not critical for the execution of the robot operation program.

In an embodiment of the invention, at least some of said respective program nodes form a node decision tree, wherein separate nodes of said respective program nodes are located on different node branches of said node decision tree.

The invention thus both relate to robot operation cycles in which the same program nodes are executed in every robot operation cycle, and robot operation cycles in which different program nodes may be executed due to a decision tree structure of the robot operation program.

In an embodiment of the invention, said respective program nodes comprises one or more hybrid nodes, wherein each of said hybrid nodes relates to at least two operational elements from the list consisting of: movement operation, tool activation operation, waiting operation, machine tending operation, and measurement operation.

Some nodes may involve multiple types of operation, e.g. simultaneous movement and tool activation. Such operations may be prone to unique anomalies, and hence having distinct node conditions for such nodes is advantageous.

In an embodiment of the invention, said respective node condition sets comprise a first node condition set and a second node condition set, wherein said at least one node condition of said first node condition set is different from said at least one node condition of said second node condition set, wherein said at least one node condition of said first node condition set is compared with said one or more robot operation parameters established in relation to execution of a first program node of said respective program nodes, wherein said at least one node condition of said second node condition set is compared with said one or more robot operation parameters established in relation to execution of a second program node of said respective program nodes, wherein said first program node and said second program node are different.

Other embodiments further have a third node condition set, which may optionally be different from the first and second sets. This third set may further be compared with robot operation parameters established in relation to execution of a third program node of the respective program nodes, which is different from the first and the second program node.

Having different node condition sets for different program nodes advantageously permit tailoring anomaly detection to different operational elements of the robot operation cycle.

In an embodiment of the invention, said at least one node condition comprises a node-specific parameter threshold of said one or more robot operation parameters for said operation anomaly.

A node-specific parameter threshold may be understood as a threshold which is specific for an associated program node. For example, a first node-specific threshold is for a first node condition set and a second node-specific threshold is for a second node condition set.

In this context, a threshold may also be absolute threshold, relative threshold (e.g. relative to average and/or relative to reference data), noise threshold (e.g. threshold of standard deviation of data). A threshold may further be in a multidimensional space, e.g. based on a Euclidian distance in a parameter space with an arbitrary number of dimensions. A threshold may also be defined relative to clusters of a subpopulation of data, e.g. a threshold may be defined by a certain multiple of standard deviations relative to a mean of a subpopulation of an overall population clustered via a gaussian mixture model. A threshold may also be defined by evaluating robot operation parameters individually relative to sub-thresholds of these parameters, and then combining (e.g. summing, weighted average, or variance) individual deviations from the sub-threshold to assess whether an overall threshold is surpassed.

A node-specific parameter threshold may also refer to a threshold of a parameter derived from the one or more robot operation parameters. E.g. a score indicative of the degree of which parameters deviate from normal or expected behavior.

Different node condition sets may comprise different node-specific parameter thresholds.

In an embodiment of the invention, said at least one node condition is based on node-specific reference data of said respective program nodes, wherein said node-specific reference data is established at least partly based on previous normal operation of said industrial robot.

In an embodiment of the invention, said at least one node condition is based on node-specific anomaly data of said respective program nodes, wherein said node-specific anomaly data is established at least partly based on previous anormal operation of said industrial robot.

Node-specific reference data may be understood as reference data related to operation/execution of a particular program node.

Previous normal operation may be understood as past robot operation cycles which have been performed without substantial deviations from expected behavior of the robot system. Previous anormal operation may be understood as past robot operation cycles which have been performed with the occurrence of a substantial deviation in expected behavior. Such a substantial deviation may be introduced intentionally by a human operator.

This is advantageous in that it has the effect that the reference data and thereby normal operation of the industrial robot is defined by actual values of robot operation parameters that are obtained during operation of the industrial robot and thereby can be used as basis e.g. for comparing with subsequent obtained values of similar robot operation parameters.

The node-specific reference data may for example be obtained based on robot operation parameters of one more previous operation cycles of the robot system. Node-specific reference data may also be established partially of fully manually, thus potentially reducing the need for previous operation cycles. The reference data may optionally be provided via a separate session, such as a dedicated training session.

Providing anomaly data obtained from anormal operation may for example be based on exposing the industrial robot to an anomaly, e.g. pushing the robot. Such data may for example be labelled as anomalous, to further the improve node condition.

In an embodiment of the invention, said at least one node condition is based on node-specific machine learning.

A node condition based on node-specific machine learning may be understood as a condition which has been established for a particular program node via machine learning. The machine learning may further be trained based on previous robot operation parameters associated with the same program node.

A machine learning algorithm may advantageously characterize conditions for normal operations, and thus also node conditions for anomalies. Machine learning is particularly well suited for this task, since patterns in robot operation parameters are complex to identify and characterize. Furthermore, many robot applications are unique, which complicates establishment of generally applicable conditions.

A single machine learning algorithm may provide conditions for the different individual program nodes. Or, optionally, different machine learning algorithms may be applied in relation to obtaining node conditions different program nodes.

In an embodiment of the invention, said node-specific parameter threshold of one of said one or more waiting nodes is based on a time threshold related to said time in program node.

Waiting beyond (or alternatively less than) the duration of the time threshold may be indicative of an anomaly. Thus, a time threshold may advantageously permit detection of such an operation anomaly.

An aspect of the invention relates to a method for detection of an operation anomaly of an industrial robot, said method comprising the steps of:

providing a robot control program with respective program nodes integrated in said robot operation program;

executing said robot operation program on a robot controller to control operation of said industrial robot according to a robot operation cycle of said robot operation program, wherein each of said respective program nodes is associated with a separate operational element of said robot operation cycle;

obtaining reference data based on operation parameters associated with execution of said robot operation program; and by an anomaly detection block, for a least one of said respective program nodes, evaluate an operation anomaly of said robot operation parameters relative to a representation of said reference data.

In an embodiment of the invention, said method further comprises the steps of:

obtaining respective node condition sets, wherein each of said respective node condition sets specifies at least one node condition respectively associated with each of said respective program nodes, comparing, for each of said respective program nodes, said at least one node condition with one or more robot operation parameters established in relation to execution of said respective program nodes, and detecting said operation anomaly based on said step of comparing said at least one node condition.

In an embodiment of the invention, said method is configured to be carry out on a robot system according to any embodiment of the invention.

In an embodiment of the invention, said operation anomaly is an exogenous operation anomaly.

An exogeneous operation anomaly may be understood as an unexpected event occurring in the exterior surroundings of the robot system. An exogeneous anomaly may thus comprise any changes in the environment surrounding the robot system, including e.g., changes in an object handled and/or manipulated by the robot system, or interactions with a human. Thus, exogeneous anomalies may be said to originate from data generating mechanisms in the robot systems environment. Such data generating mechanism could e.g. be pushing the robot arm and/or hindering the motion of the robot arm, under the condition that pushing or hindering the robot motion is not a part of the expected behavior, as defined by e.g. the robot program controlling the robot operation.

Detection of an exogeneous anomaly is a prerequisite for acting upon that exogeneous anomaly. Therefore, a robot system capable of detecting an exogenous anomaly is advantageous in that it empowers the robot system to act upon an exogenous anomaly, which could e.g. damage the robot system and/or cause harm to its surroundings, if not detected and acted upon. Thereby a robot system capable of detecting exogenous anomalies may facilitate safe utilization of the robot system in e.g. less controlled environments, where the surroundings of the robot system may unintentionally interact with the robot system to cause exogenous anomalies.

In an embodiment of the invention, said method comprises a step of training a neural network based on said node-specific reference data to establish at least one of said at least one node condition.

This is advantageous in that it has the effect that a neural network may learn complex non-linear relationships between robot operation parameters and anomalies (or normal operation), and thereby detect anomalies with high accuracy and sensitivity. Additionally, the structure of a neural network may advantageously utilize parallel processing to achieve high computational efficiency.

In an embodiment of the invention, said neural network forms at least a part of said autoencoder, wherein said autoencoder has an input layer, an output layer, and at least one hidden layer connecting said input layer and said output layer.

Encoding and decoding is computationally cheap, which is advantageous. And this is thus particularly advantageous when the anomaly detection block is integrated in the robot controller, since it may not have a lot of surplus processing power. Some autoencoders may be implemented in practice as matrix operations applied to the raw data.

Further, utilizing an autoencoder is advantageous since encoding/decoding may be used to filter noise, which may otherwise disturb anomaly detection.

An autoencoder may be understood as a type of artificial neural network which can be used to learn feature detection or classification from data. Examples of a relevant autoencoder are variational autoencoder, one-pass variational autoencoder, conditional variational autoencoder, and long short-term memory autoencoder, but note that the invention is not restricted to a particular autoencoder.

In an embodiment of the invention, said method further comprises a step of modifying at least one of said at least one node condition based on said robot operation parameters based on a recently performed robot operation cycle.

Modifying conditions may improve the anomaly detection. Further, it may be particularly advantageous for improving anomaly detection in relation to node branches not visited often during operation. A step of modifying a condition may further be combined with a user approving the modification.

The invention may utilize machine learning and artificial intelligence for different tasks, such as clustering, establishing reference data, establishing node conditions, encoding/decoding, modifying conditions and any combination thereof. For these difference purposes, different algorithms may be utilized, or a single algorithm for different tasks may be used.

In an embodiment of the invention, said method further comprises a step of providing an anomaly notification to a user based on said operation anomaly.

In an embodiment of the invention, said anomaly notification is indicative of one or more of said respective program nodes in which said operation anomaly was detected.

By pointing to one or more particular nodes, the user may easier be able to identify the anomaly, the severity of the anomaly, and whether further action is required, which is advantageous.

In an embodiment of the invention, said anomaly notification is indicative of which of said at least one node condition upon which said operation anomaly was detected.

By pointing to one or more particular node conditions, the user may easier be able to identify the anomaly, the severity of the anomaly, and whether further action is required, which is advantageous.

In an embodiment of the invention, said anomaly notification is accompanied by a heat map in which position is indicative of said respective program node, and in which intensity is indicative of anomaly graduation.

Anomaly graduation may be understood as a measure indicative of at least some of the robot operation parameters relative to one or more of the various node conditions. By providing such a heat map, the user is aided in assessing both the severity of the anomaly and the robustness of the robot operation program, which is advantageous.

An aspect of the invention relates to a computer program comprising instructions for detection of an operation anomaly of an industrial robot, wherein said computer program causes a robot system to carry out the following steps when said computer program is executed:

comparing at least one node condition with one or more robot operation parameters for each of respective program nodes of a robot control program, wherein said one or more robot operation parameters are established in relation to execution of said respective program nodes to control said industrial robot, wherein each of respective node condition sets specifies said at least one node condition respectively associated with said respective program nodes; and detecting said operation anomaly based on said step of comparing said at least one node condition.

In an embodiment of the invention, said computer program is further configured to carry out the method according to any embodiment of the invention.

Computer programs according to the invention may have any of the same advantageous and/or features of robot systems and methods according to the invention.

A computer program according to the invention may for example be downloadable via the internet, such that it can be implemented as part of a robot system, e.g. on the robot controller, or on another processing unit in communication with the robot controller and/or the industrial robot.

BRIEF DESCRIPTION OF THE DRAWINGS

FIG. 5 illustrates a method for detection of an operation anomaly according to an embodiment of the invention, FIG. 6 illustrates a method for detection of an operation anomaly according to another embodiment of the invention, FIG. 7 illustrates a framework for hyperparameter optimization which may be utilized in embodiments of the invention.

DETAILED DESCRIPTION OF THE INVENTION

The present invention is described in view of exemplary embodiments only intended to illustrate the principles of the present invention. The skilled person will be able to provide several embodiments within the scope of the claims.

Figure 1:
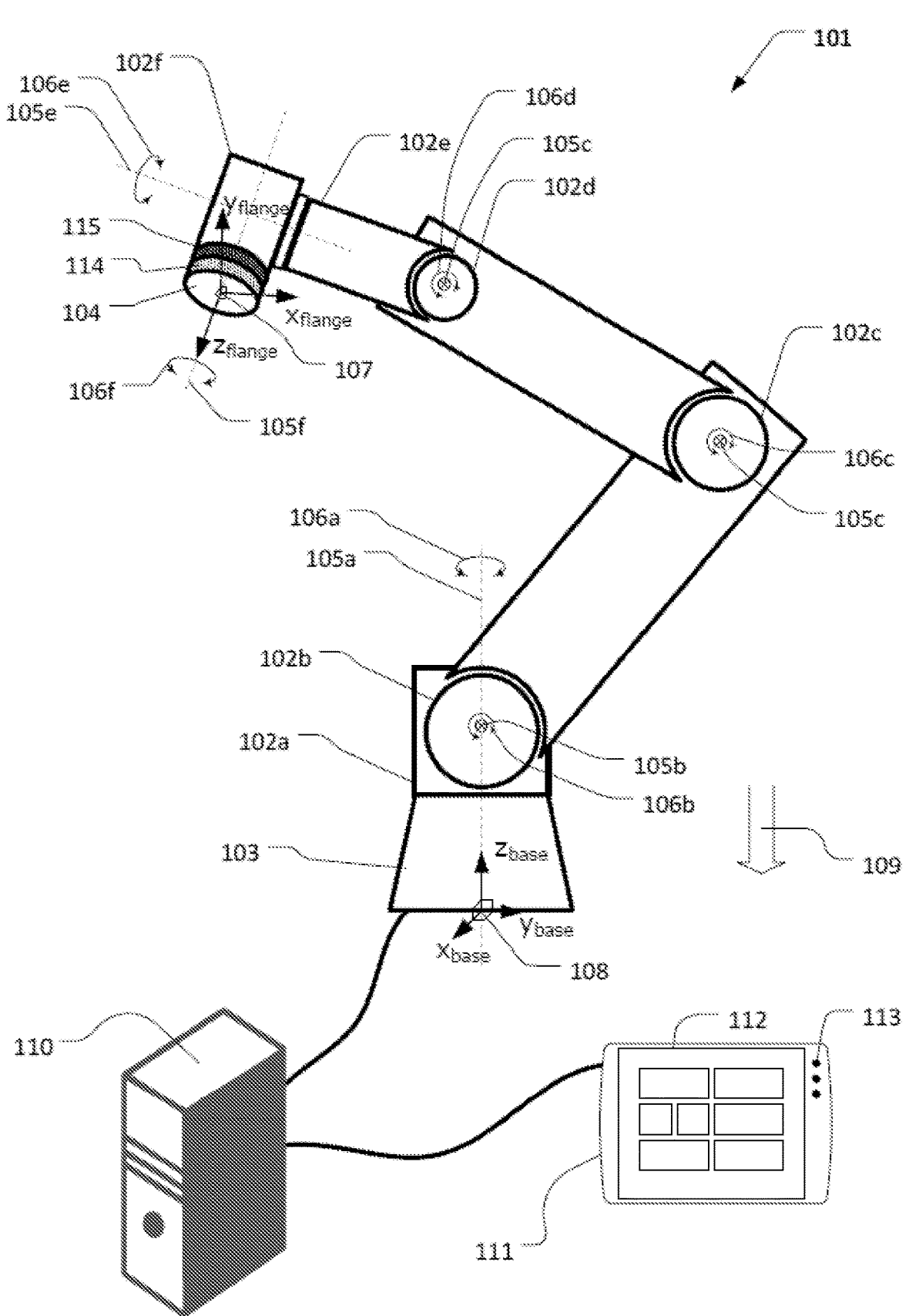
FIG. 1 illustrates a robot arm according to the present invention.

FIG. 1 illustrates a robot arm 101 comprising a plurality of robot joints 102a, 102b, 102c, 102d, 102e, 102f connecting a robot base 103 and a robot tool flange 104. A base joint 102a is configured to rotate the robot arm 101 around a base axis 105a (illustrated by a dashed dotted line) as illustrated by rotation arrow 106a; a shoulder joint 102b is configured to rotate the robot arm around a shoulder axis 105b (illustrated as a cross indicating the axis) as illustrated by rotation arrow 106b; an elbow joint 102c is configured to rotate the robot arm around an elbow axis 105c (illustrated as a cross indicating the axis) as illustrated by rotation arrow 106c, a first wrist joint 102d is configured to rotate the robot arm around a first wrist axis 105d (illustrated as a cross indicating the axis) as illustrated by rotation arrow 106d and a second wrist joint 102e is configured to rotate the robot arm around a second wrist axis 105e (illustrated by a dashed dotted line) as illustrated by rotation arrow 106e. Robot joint 102f is a tool joint comprising the robot tool flange 104, which is rotatable around a tool axis 105f (illustrated by a dashed dotted line) as illustrated by rotation arrow 106f. The illustrated robot arm is thus a six-axis robot arm with six degrees of freedom with six rotational robot joints, however it is noticed that the present invention can be provided in robot arms comprising less or more robot joints and also other types of robot joints such as prismatic robot joints providing a translation of parts of the robot arm for instance a linear translation.

A robot tool flange reference point 107 also known as a Tool Center Point (TCP) is indicated at the robot tool flange and defines the origin of a tool flange coordinate system defining three coordinate axis $x_{flange}$, $y_{flange}$, $z_{flange}$. In the illustrated embodiment the origin of the robot tool flange coordinate system has been arrange on the tool flange axis 105f with one axis ($z_{fange}$) parallel with the tool flange axis and with the other axes $x_{flange}$, $y_{flange}$ parallel with the outer surface of the robot tool flange 104. Further a base reference point 108 is coincident with the origin of a robot base coordinate system defining three coordinate axes $x_{base}$, $y_{base}$, $z_{base}$. In the illustrated embodiment the origin of the robot base coordinate system has been arrange on the base axis 105a with one axis ($z_{base}$) parallel with the base axis 105a and with the other axes $x_{base}$, $y_{base}$ parallel with the bottom surface of the robot base. The direction of gravity 109 in relation to the robot arm is also indicated by an arrow and it is to be understood that the robot arm can be arrange at any position and orientation in relation to gravity.

The robot arm comprises at least one robot controller 110 configured to control the robot arm 101 and can be provided as a computer comprising in interface device 111 enabling a user to control and program the robot arm. The controller 110 can be provided as an external device as illustrated in FIG. 1 or as a device integrated into the robot arm or as a combination thereof. The interface device can for instance be provided as a teach pendent as known from the field of industrial robots which can communicate with the controller 110 via wired or wireless communication protocols. The interface device can for instanced comprise a display 112 and a number of input devices 113 such as buttons, sliders, touchpads, joysticks, track balls, gesture recognition devices, keyboards etc. The display may be provided as a touch screen acting both as display and input device. The interface device can also be provided as an external device configured to communicate with the robot controller 110, for instance as smart phones, tablets, PCs, laptops, etc.

The robot tool flange 104 comprises a force-torque sensor 114 (sometimes referred to simply as fore sensor) integrated into the robot tool flange 104. The force-torque sensor 114 provides a tool flange force signal indicating a force-torque provided at the robot tool flange. In the illustrated embodiment the force-torque sensor is integrated into the robot tool flange and is configured to indicate the forces and torques applied to the robot tool flange in relation to the robot tool flange reference point 107. The force sensor 114 provides a force signal indicating a force provided at the tool flange. In the illustrated embodiment the force sensor is integrated into the robot tool flange and is configured to indicate the forces and torques applied to the robot tool flange in relation to the reference point 107 and in the tool flange coordinate system. However, the force-torque sensor can indicate the force-torque applied to the robot tool flange in relation to any point which can be linked to the robot tool flange coordinate system. In one embodiment the force-torque sensor is provided as a six-axis force-torque sensor configured to indicate the forces along and the torques around three perpendicular axes. The force-torque sensor can for instance be provided as any force-torque sensor capable of indicating the forces and torques in relation to a reference point for instance any of the force-torque sensors disclosed by WO2014/110682A1, U.S. Pat. No. 4,763,531, US2015204742. However, it is to be understood that the force sensor in relation to the present invention not necessarily need to be capable of sensing the torque applied to the tool sensor. It is noted that the force-torque sensor may be provided as an external device arranged at the robot tool flange or omitted.

An acceleration sensor 115 is arranged at the robot tool joint 102f and is configured to sense the acceleration of the robot tool joint 102f and/or the acceleration of the robot tool flange 104. The acceleration sensor 115 provides an acceleration signal indicating the acceleration of the robot tool joint 102f and/or the acceleration of the robot tool flange 104. In the illustrated embodiment the acceleration sensor is integrated into the robot tool joint and is configured to indicate accelerations of the robot tool joint in the robot tool coordinate system. However, the acceleration sensor can indicate the acceleration of the robot tool joint in relation to any point which can be linked to the robot tool flange coordinate system. The acceleration sensor can be provided as any accelerometer capable of indicating the accelerations of an object. The acceleration sensor can for instance be provided as an IMU (Inertial Measurement Unit) capable of indicating both linear acceleration and rotational accelerations of an object. It is noted that the acceleration sensor may be provided as an external device arranged at the robot tool flange or omitted.

Each of the robot joints comprises a robot joint body and an output flange rotatable or translatable in relation to the robot joint body and the output flange is connected to a neighbor robot joint either directly or via an arm section as known in the art. The robot joint comprises a joint motor configured to rotate or translate the output flange in relation to the robot joint body, for instance via a gearing or directly connected to the motor shaft. The robot joint body can for instance be formed as a joint housing and the joint motor can be arranged inside the joint housing and the output flange can extend out of the joint housing. Additionally, the robot joint comprises at least one joint sensor providing a sensor signal indicative of at least one of the following parameters: an angular and/or linear position of the output flange, an angular and/or linear position of the motor shaft of the joint motor, a motor current of the joint motor or an external force and/or torque trying to rotate the output flange or motor shaft. For instance, the angular position of the output flange can be indicated by an output encoder such as optical encoders, magnetic encoders which can indicate the angular position of the output flange in relation to the robot joint. Similarly, the angular position of the joint motor shaft can be provided by an input encoder such as optical encoders, magnetic encoders which can indicate the angular position of the motor shaft in relation to the robot joint. It is noted that both output encoders indicating the angular position of the output flange and input encoders indicating the angular position of the motor shaft can be provided, which in embodiments where a gearing have been provided makes it possible to determine a relationship between the input and output side of the gearing. The joint sensor can also be provided as a current sensor indicating the current through the joint motor and thus be used to obtain the torque provided by the motor. For instance, in connection with a multiphase motor, a plurality of current sensors can be provided in order to obtain the current through each of the phases of the multiphase motor. It is also noted that some of the robot joints may comprise a plurality of output flanges rotatable and/or translatable by joint actuators, for instance one of the robot joints may comprise a first output flange rotating/translating a first part of the robot arm in relation to the robot joint and a second output flange rotating/translating a second part of the robot arm in relation to the robot joint.

The robot controller 110 is configured to control the motions of the robot arm by controlling the motor torque provided to the joint motors based on a dynamic model of the robot arm, the direction of gravity acting 109 and the joint sensor signal.

Figure 2:
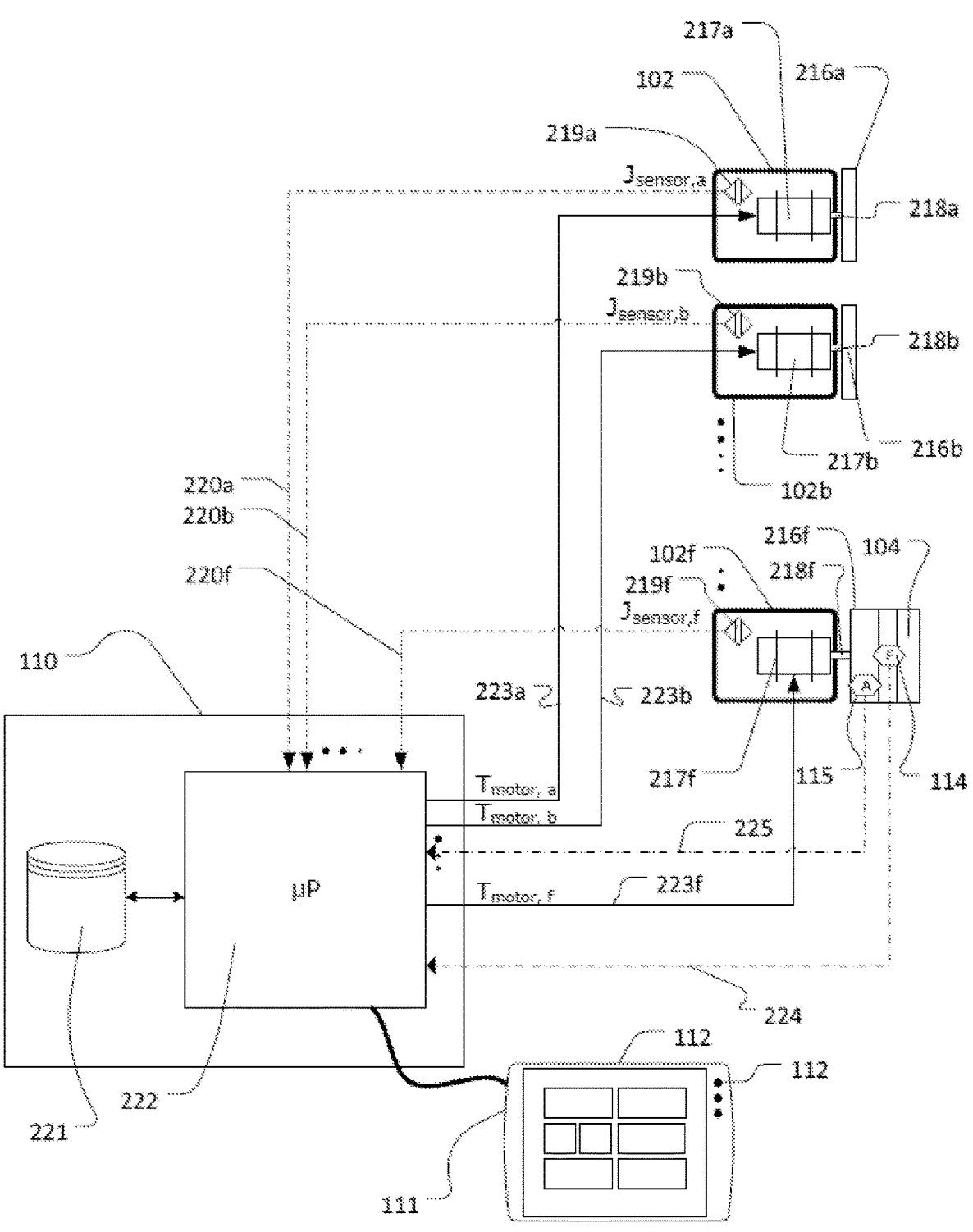
FIG. 2 illustrates a simplified structural diagram of the robot arm and part of the robot controller.

FIG. 2 illustrates a simplified structural diagram of the robot arm 101 illustrated in FIG. 1. The robot joints 102a, 102b and 102f have been illustrated in structural form and the robot joints 102c, 102d, 102e and the robot links connecting the robot joints have been omitted for the sake of simplicity of the drawing. Further the robot joints are illustrated as separate elements however it is to be understood that they are interconnected as illustrated in FIG. 1. The robot joints comprise an output flange 216a, 216b,216f and a joint motor 217a, 217b, 217f or another kind of actuator, where the output flange 216a,216b,216f is rotatable in relation to the robot joint body. The joint motors 217a, 217b, 217f are respectively configured to rotate the output flanges 216a, 216b, 216f via an output axle 218a, 218b, 218f. It is to be understood that the joint motor or joint actuator may be configured to rotate the output flange via a transmission system such as a gear (not shown). In this embodiment the output flange 216f of the tool joint 123f constitutes the tool flange 104. At least one joint sensor 219a, 219b, 219f providing a sensor signal 220a, 220b, 220f indicative of at least one joint sensor parameter $J_{sensor,a}$, $J_{sensor,b}$, $J_{sensor,f}$ of the respective joint. The joint sensor parameter can for instance indicate a pose parameter indicating the position and orientation of the output flange in relation to the robot joint body, an angular position of the output flange, an angular position of a shaft of the joint motor, a motor current of the joint motor. For instance, the angular position of the output flange can be indicated by an output encoder such as optical encoders, magnetic encoders which can indicate the angular position of the output flange in relation to the robot joint. Similar, the angular position of the joint motor shaft can be provided by an input encoder such as optical encoders, magnetic encoders which can indicate the angular position of the motor shaft in relation to the robot joint. The motor currents can be obtained and indicated by current sensors.

The robot controller 110 comprises a processer 220 and memory 221 and is configured to control the joint motors of the robot joints by providing motor control signals 223a, 223b, 223f to the joint motors. The motor control signals 223a, 223b, 223f are indicative of the motor torque $T_{motor,a}$, $T_{motor,b}$, and $T_{motor,f}$ that each joint motor shall provide to the output flanges and the robot controller 110 is configured to determine the motor torque based on a dynamic model of the robot arm as known in the prior art. The dynamic model makes it possible for the controller 110 to calculate which torque the joint motors shall provide to each of the joint motors to make the robot arm perform a desired movement. The dynamic model of the robot arm can be stored in the memory 221 and be adjusted based on the joint sensor parameters $J_{sensor,a}$, $J_{sensor,b}$, $J_{sensor,f}$ For instance, the joint motors can be provided as multiphase electromotors and the robot controller 110 can be configured to adjust the motor torque provided by the joint motors by regulating the current through the phases of the multiphase motors as known in the art of motor regulation.

Robot tool joint 102f comprises the force sensor 114 providing a tool flange force signal 224 indicating a force-torque $FT_{flange}$ provided to the tool flange. For instance, the force signal-torque $FT_{flange}$ can be indicated as a force vector $\overrightarrow{F_{sensor}^{flange}}$ and a torque vector $\overrightarrow{T_{sensor}^{flange}}$ in the robot tool flange coordinate system:

$$\overrightarrow{F_{sensor}^{flange}} = \begin{pmatrix} F_{x,sensor}^{flange} \\ F_{y,sensor}^{flange} \\ F_{z,sensor}^{flange} \end{pmatrix} \qquad \text{eq. 1}$$

where $F_{x,sensor}^{flange}$ is the indicated force along the $x_{flange}$ axis, $T_{y,sensor}^{flange}$ is the indicated force along the $y_{flange}$ axis and $F_{z,sensor}^{flange}$ is the indicated force along the $z_{flange}$ axis.

In addition to the above, the robot controller 110 of the present invention may include a PLC code import/translate module (not illustrated). Such module facilitates importing PLC code stored e.g. on a PLC or on a PLC code developing tool connected to the robot controller either directly (e.g. wired or wireless connection) or indirectly (via e.g. the internet). Further, such module may facilitate translation of the PLC code to robot control software executable the robot controller.

In an embodiment where the force sensor is provided as a combined force-torque sensor the force-torque sensor can additionally also provide a torque signal indicating the torque provide to the tool flange, for instance as a separate signal (not illustrated) or as a part of the force signal. The torque can be indicated as a torque vector in the robot tool flange coordinate system:

$$\overrightarrow{T_{sensor}^{flange}} = \begin{pmatrix} T_{x,sensor}^{flange} \\ T_{y,sensor}^{flange} \\ T_{z,sensor}^{flange} \end{pmatrix} \qquad \text{eq. 2}$$

where $T_{x,sensor}^{flange}$ is the indicated torque around the $x_{flange}$ axis, $T_{y,sensor}^{flange}$ is the indicated torque around the $y_{flange}$ axis and $T_{z,sensor}^{flange}$ is the indicated torque around the $z_{flange}$ axis.

Robot tool joint 102$f$ comprises the acceleration sensor 115 providing an acceleration signal 225 indicating the acceleration of the robot tool flange where the acceleration may be indicated in relation to the tool flange coordinate system $$\overrightarrow{A_{sensor}^{flange}} = \begin{pmatrix} A_{x,sensor}^{flange} \\ A_{y,sensor}^{flange} \\ A_{z,sensor}^{flange} \end{pmatrix}$$

where $A_{x,sensor}^{flange}$ is the sensed acceleration along the $x_{flange}$ axis, $A_{y,sensor}^{flange}$ is the sensed acceleration along the $y_{flange}$ axis and $A_{z,sensor}^{flange}$ is the sensed acceleration along the $z_{flange}$ axis.

In an embodiment where the acceleration sensor is provided as a combined accelerometer/gyrometer (e.g. an IMU) the acceleration sensor can additionally provide an angular acceleration signal indicating the angular acceleration of the output flange in relation to the robot tool flange coordinate system, for instance as a separate signal (not illustrated) or as a part of the acceleration signal. The angular acceleration signal can indicate an angular acceleration vector $\overrightarrow{\alpha_{sensor}^{flange}}$ in the robot tool flange coordinate system $$\overrightarrow{\alpha_{sensor}^{flange}} = \begin{pmatrix} \alpha_{x,sensor}^{flange} \\ \alpha_{y,sensor}^{flange} \\ \alpha_{z,sensor}^{flange} \end{pmatrix} \qquad \text{eq. 3}$$

where $\overrightarrow{\alpha_{x,sensor}^{flange}}$ is the angular acceleration around the $x_{flange}$ axis, $\alpha_{y,sensor}^{flange}$ is the angular acceleration around the $y_{flange}$ axis and $\alpha_{z,sensor}^{flange}$ is the angular acceleration around the $z_{flange}$ axis.

The force sensor and acceleration sensor of the illustrated robot arm are arranged at the robot tool joint 102$f$; however, it is to be understood that the force sensor and acceleration sensor can be arrange at any part of the robot arm and that a plurality of such sensors can be provided at the robot arm.

The robot controller 110 can optionally have an integrated anomaly detection block for detecting operational anomalies.

Figure 3:
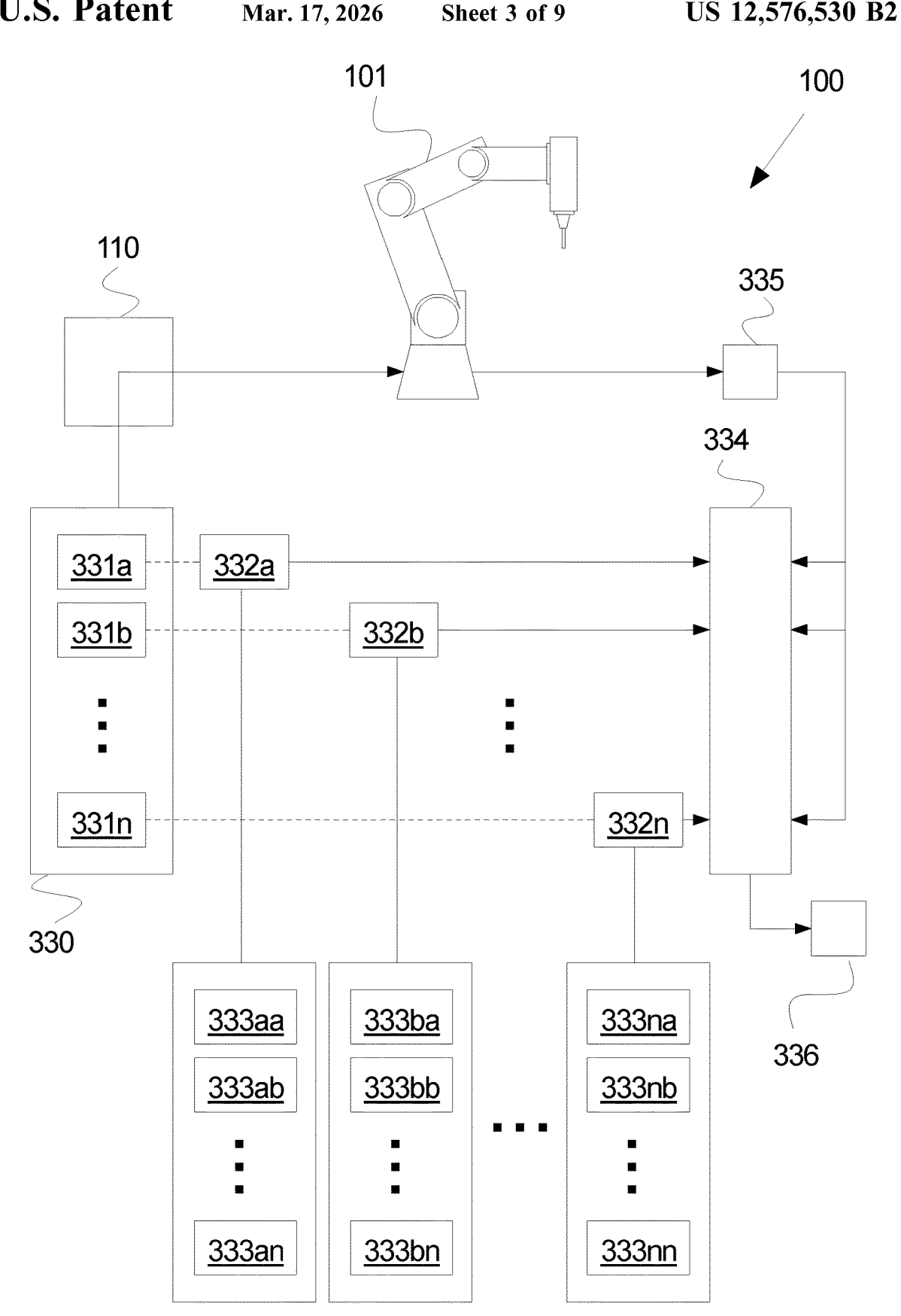
FIG. 3 illustrates a robot system according to an embodiment of the invention.

FIG. 3 illustrates a robot system 100 according to an embodiment of the invention.

The embodiment has a robot operation program 330 which is executable on a robot controller 110, upon which the robot controller 110 controls operation of the robot arm 101. The robot operation program 330 has been established by a user externally from the robot controller 110, but to operate the robot arm 101, the program is communicated to the controller 110. In an alternative embodiment, the program is established directly on the robot controller, for example via a user interface. Thus, for embodiments of the invention, the robot operation program is not restricted to any particular method and facilitation of establishment.

The robot operation program has a number of respective program nodes 331$a$, 331$b$, . . . 331$n$. Execution of the robot operation program corresponds at least to execution of some of these respective program nodes, and accordingly, the robot arm is operated according to a robot operation cycle.

For this embodiment, a robot operation cycle corresponds to the robot arm performing a predefined repetitive task in a robot application. Particularly, in this embodiment, workpieces are palletized by the robot arm. One robot operation cycle corresponds to palletizing of one workpiece.

Execution of a respective program node 331$a$, 331$b$, . . . 331$n$ leads to the robot arm performing a particular operational element of the application. The various operational elements in this embodiment are: movement of (gripping) tool to workpiece-receiving position, waiting for workpiece, gripping workpiece by tool activation, movement of workpiece to vacant palletizing spot, and releasing workpiece by tool deactivation. An alternative embodiment further has an operational element of identifying a vacant palletizing spot. Each of the operational elements is associated with one of the respective program nodes 331$a$, 331$b$, . . . 331$n$.

Each of the respective program nodes 331$a$, 331$b$, . . . 331$n$ is respectively associated with a respective node condition set 332$a$, 332$b$, . . . 332$n$. That is, a first program node 331$a$ is associated with a first node condition set 332$a$, a second program node 331$b$ is associated with a second node condition set 332$b$, etc. Each of the respective node condition sets 332$a$, 332$b$, . . . 332$n$ specifies at least one node condition 333$na$, 333$nb$, . . . 333$nn$. One of the respective node conditions sets can specify just one node condition, whereas another can specify several node conditions. Thus, each of the sets 332$a$, 332$b$, . . . 332$n$ is not restricted to a particular number of node conditions 333$na$, 333$nb$, . . . 333$nn$.

Via the node condition set 332$a$, 332$b$, . . . 332$n$ that a given node condition 333$na$, 333$nb$, . . . 333$nn$ is a part of, each node condition is associated with one of the respective program nodes 331$a$, 331$b$, . . . 331$n$. Thus, node conditions 333$aa$, 333$ab$, . . . 333$an$ of the first node condition set 332$a$ are associated with the first respective program node 331$a$, Node conditions 333$ba$, 333$bb$, . . . 333$bn$, of the second node condition set 332$b$ are associated with the second respective program node, etc.

Each of the various node conditions 333$na$, 333$nb$, . . . 333$nn$ determine a condition for when operation according to the associated program node can be considered normal, and thus also conditions for operation anomalies (when operation is not normal). Since operation of the industrial robot is prone to different types of operation anomalies during the separate operational elements, anomaly detection is most optimally performed by having different node conditions in association with the different program nodes.

The determination of whether an operation anomaly occurs is based on a comparison of the various node conditions with robot operation parameters 335. In this embodiment, the operation parameters 335 comprise joint data (of the robot arm) and time stamps. This comparison is performed in an anomaly detection block 334. In this embodiment, the detection block 334 is implemented as a part of an external computer architecture comprising a processor and digital memory. The computer architecture is external in the sense that it is not a part of the robot controller 110.

In this embodiment, the various node conditions involve a threshold of the robot operation parameters 335 relative to the reference data. By averaging robot operation parameters of several previously performed operation cycles, reference data indicative of normal operation has been obtained. One node condition involves, a relative Euclidian distance of newly obtained robot operation parameters 335 to the reference data. The Euclidian distance surpassing a relative threshold then corresponds to detection of an operation anomaly.

For the program node corresponding to movement of (gripping) tool to workpiece-receiving position, the relative anomaly threshold is larger than for the program node corresponding to movement of workpiece to vacant palletizing spot, since the movement without the workpiece is faster, and larger deviations are thus normal. The program node corresponding to waiting for workpiece only has a single node condition based on timestamps. Waiting for a workpiece for more than 5 seconds corresponds to an anomaly. For the program node corresponding to tool activation, the relative anomaly threshold is larger than for the program node corresponding to tool deactivation, since the program involves careful and precise placement of the workpiece in association with deactivating the tool, and thus, larger deviations are normal during activation than during deactivation.

Thus, the different respective program nodes $331a$, $331b$, . . . $331n$ are associated with at least one node condition $333na$, $333nb$, . . . $333nn$. In this embodiment, the various node conditions pose different constraints to the program nodes and the corresponding operational elements, as to when a given deviation of the robot operation parameters can be considered an operation anomaly. Whenever a comparison between the robot operation parameters $335$ and the node conditions $333na$, $333nb$, . . . $333nn$ finds that a condition for an operation anomaly is met, the anomaly detection block $334$ digitally identifies that an operation anomaly $336$ has occurred. In this embodiment, the anomaly detection block $334$ yields a digital representation of the operation anomaly $336$ which may be provided to a user. Namely, the representation of the operation anomaly $336$ is visualized on a monitor of the computer architecture. Thus, a user may assess whether further action is necessary, and optionally modify one or more of the respective program nodes $331a$, $331b$, . . . $331n$.

Figure 4:
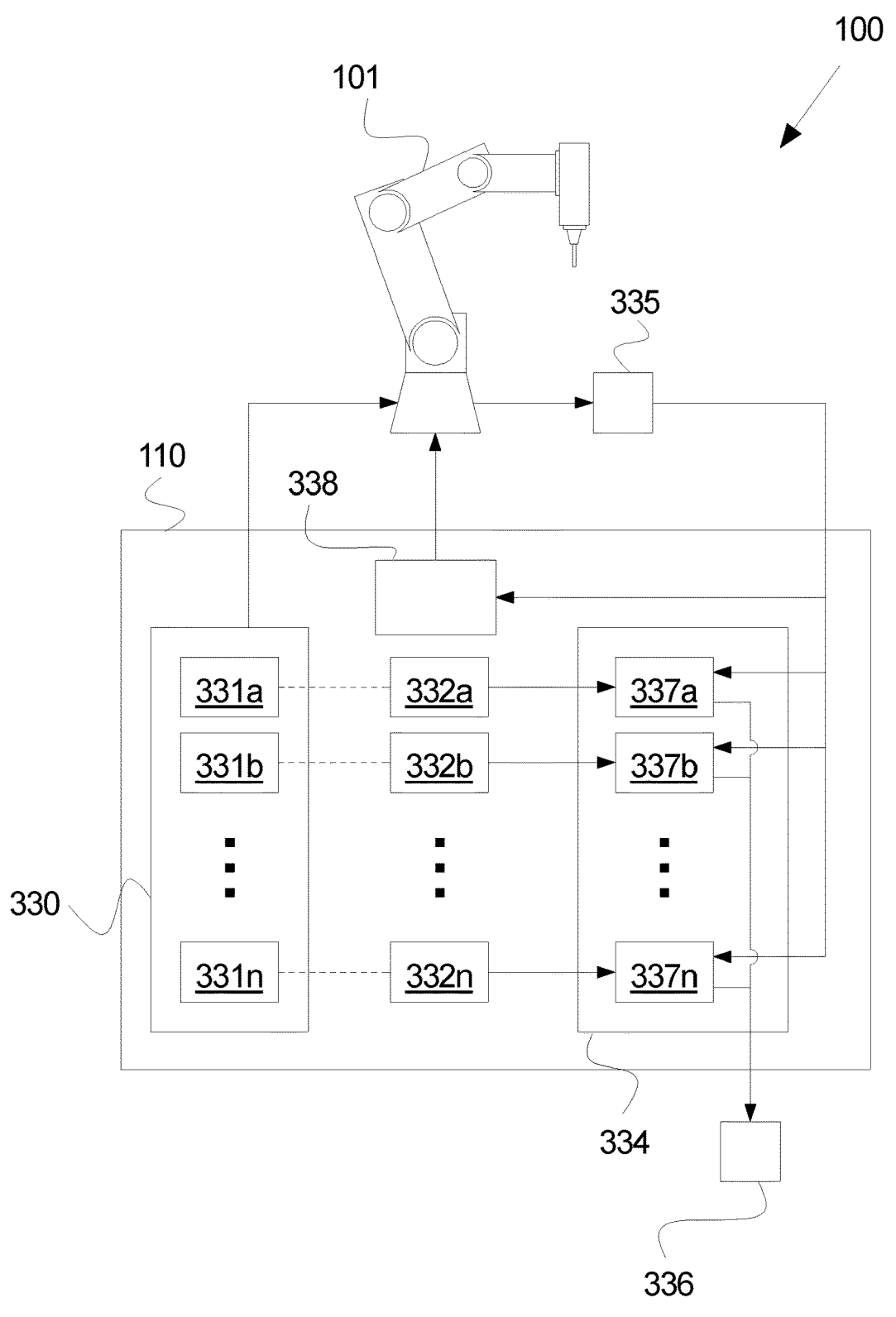
FIG. 4 illustrates a robot system according to another embodiment of the invention, in which the anomaly detection block is integrated in the robot controller.

FIG. 4 illustrates a robot system $100$ according to another embodiment of the invention, in which the anomaly detection block $334$ is integrated in the robot controller $110$. Furthermore, this embodiment has an Emergency safety stop block $338$.

In similarity with the embodiment illustrated in FIG. 3, the embodiment of FIG. 4 comprises a robot operation program with respective program nodes $331a$, $331b$, . . . $331n$, each respectively associated with respective node condition sets $332a$, $332b$, . . . $332n$, which in turn each comprises at least one node condition. Note that some illustrations of node conditions are omitted for the sake of not obscuring the figure with unnecessary details.

However, in contrast to the embodiment of FIG. 3., the embodiment illustrated in FIG. 4 has its anomaly detection block $334$ as an integrated part of the robot controller $110$. The robot controller has a microprocessor (not shown) which both control the robot arm according to the robot operation program $330$, and which at least partly facilitate the anomaly detection block $334$. Further, the various node conditions are kept in the digital memory (not shown) of the robot controller $110$. Accordingly, the robot system is able to operate and perform anomaly detection independently from external units, input/output, or control (besides power supply).

Additionally, in this embodiment, the anomaly detection block $334$ comprises a number of node-specific sub-blocks $337a$, $337b$, . . . $337n$. The first node-specific sub-block $337a$ compares robot operation parameters $335$ established in relation to execution of the first program node $331a$ with the node conditions of first node condition set $332a$ associated with the first program node $331a$. The second node-specific sub-block $337b$ compares robot operation parameters $335$ established in relation to execution of the second program node $331b$ with the node conditions of second node condition set $332b$ associated with the second program node $331a$. Similarly, each of the remaining node-specific sub-blocks performs comparisons in relation to a specific program node. A node-specific sub-block $337a$, $337b$, . . . $337n$ is thus able to identify an operation anomaly in relation to a particular program node $331a$, $331b$, . . . $331n$. Upon detection of an operation anomaly, the system $100$ provides an indication of which of the respective program nodes in which the operation anomaly $336$ was detected. In alternative embodiments, the system $100$ may further provide an indication of which of the node conditions upon which the operation anomaly was detected. For example, whether the anomaly was due to a deviation of joint angle, force-torque, or time in program node.

The robot controller further has an emergency safety stop block $338$, which functions independently from the anomaly detection block $334$. In this embodiment, it can however use the same input of robot operation parameters $335$. And in this embodiment, the emergency safety stop block $338$ is integrated in the robot controller $110$, in similarity with the controller-integrated anomaly detection block $334$. In alternative embodiments, the emergency safety stop block is not integrated in the robot controller but is implemented in a separate controller or processor.

The emergency safety stop block $338$ continuously analyzes robot operation parameters $335$ to check whether an emergency safety stop should be performed. It may for example analyze the robot operation parameters $335$ to identify whether an emergency stop threshold is surpassed. An emergency stop may for example be performed if a sufficiently large collision occurs, e.g. if a force is applied to the robot arm which is at least 50 Newton. In various embodiments, the node conditions and the emergency stop threshold may apply to the same robot operation parameters $335$, but the emergency step requires a larger deviation from normal operation to active, than the deviation required for anomaly detection. If the emergency stop threshold is surpassed by robot operation parameters, operation of the robot arm $101$ is immediately halted. Consequently, the anomaly detection block can detect anomalies that does not activate the safety stop block $334$.

In an alternative embodiment, various tasks performed by the robot controller (operation, anomaly detection, emergency safety stop) are distributed across multiple processors of the robot controller $110$.

FIG. 5 illustrates a method for detection of an operation anomaly of an industrial robot according to an embodiment of the invention. This particular method has five method steps S1-S5.

In a first step S1 of the method, a robot control program with respective program nodes integrated in the robot control program is provided. The robot control program may for example be established and provided by a user.

In a next step S2, respective node condition sets are obtained. Each of the respective node condition sets specifies at least one node condition respectively associated with each of the respective program nodes. The node condition sets may for example be generated automatically by a computer algorithm such as a machine learning algorithm or be generated manually by a user.

In a next step S3, the robot operation program is executed on a robot controller to control operation of the industrial robot according to a robot operation cycle of the robot operation program. Each of the respective program nodes is associated with a separate operational element of the robot operation cycle.

In a next step S4, the at least one node condition is compared with one or more robot operation parameters established in relation to execution of the respective program nodes. The comparison is performed for each of the respective program nodes, such that a node condition of a node condition set associated with a given program node is compared with robot operation parameters established in relation to execution of that given program node.

In a next step S5, the operation anomaly is detected based on the step S4 in which at least one node condition is compared with one or more robot operation parameters. Such a detection relies on the occurrence of an operation anomaly. However, anomalies can typically not be predicted, and in some embodiments of the invention, anomalies may not necessarily occur in each robot operation cycle. Hence, several robot operation cycles may be completed prior to the occurrence and detection of an anomaly.

FIG. 6 illustrates a method for detection of an operation anomaly of an industrial robot according to another embodiment of the invention. This particular method has six method steps S6-S11. In this and other embodiments, the steps may be performed repeatedly, iteratively, and/or simultaneously.

In a first step S6 of the method, a robot control program with respective program nodes integrated in the robot operation program is provided.

In a next step S7 of the method, node-specific reference data is obtained. This reference data is based on previous executions of the robot operation program, which are performed as a separate training session.

During this training sessions, node-specific reference data is obtained by repetitively executing the robot control program on the robot controller to control operation of the industrial robot. The repetitive robot operation cycles of the training session include both normal operation cycles 641 (reference data) and anomality operation cycles 642 (anomaly data). The operation of the industrial robot is supervised by a human operator, which ensure the some of the robot operation cycles are performed by the industrial robot as intended. These robot operation cycles are then the normal operation cycles 641. The operator further manually introduce anomalies into some other of the robot operation cycles, for example by pushing the industrial robot. These robot operation cycles are then the anomality operation cycles 642. The data obtained from the different operation cycles 641, 642 is labelled accordingly.

The data is provided to a machine learning algorithm 640, which then identifies patterns in the reference data of normal operation. In addition to the reference data based on normal operation cycles 641, the machine learning algorithm is also trained with data of anomality operation cycles 642. Since the data is labelled, the training may be understood as supervised learning. However, note that the invention is not limited to supervised learning, but that it may also, for example, be implemented using unsupervised or semi-supervised learning.

The steps of providing a robot control program S6 and obtaining node-specific reference data S7 may optionally be performed iteratively to optimize the robot control program. For example, after establishment of the robot control program, the program is tested by operating the industrial robot. After observing a couple of robot operation cycles, the operator decides that a few details of the robot control program can be improved, and the operator changes the program accordingly. After providing the improved robot control program, the program is tested again. This iterative process may then be repeated until the operator has no further changes. Upon this, the reference data generated in relation to the final robot control program is provided to the machine learning algorithm 640. Optionally, parts of previous iterations of the robot control program may also be provided to the machine algorithm.

In a next step S8 of the method, respective node condition sets are obtained. Each of the respective node condition sets specifies at least one node condition respectively associated with each of the respective program nodes. The at least one node condition of the node condition sets are established based on the machine learning algorithm 640, which is capable of identifying complex patterns in the node-specific reference data established in during the training session. Accordingly, each program node of the robot control program now has one or more node-specific constraints, which are suitable for distinguishing an operation anomaly from normal operation.

In a next step S9 of the method, the robot operation program is executed on the robot controller to control operation of the industrial robot according to the robot operation cycle of that robot operation program. And each of the respective program nodes is associated with a separate operational element of the robot operation cycle.

In a next step S10 of the method, for each of the respective program nodes, the at least one node condition is compared with one or more robot operation parameters established in relation to execution of the respective program nodes.

These two steps of executing the robot operation program S9 and comparing the at least one node condition S10 are performed simultaneously and repetitively by the robot in its application. During typical robot operation cycles, no anomalies are detected. However, if the robot operation parameters exceed the any of the various node constraints, the method proceeds to the next step S11 of the method.

In this next step S11 of the method, an operation anomaly is detected based on the step S10 of comparing at least one node condition. In this embodiment an anomaly notification is provided to a user or the operator associated with the industrial robot. Upon this, the user or the operator may decide to reconfigure the robot control program, corresponding to providing a new robot control program. Upon this, any of the steps of the method may be repeated, as indicated by the arrow from the step of detecting the operation anomaly S11 to the step of providing a robot control program S6. Such repetition of steps may involve establishment of new reference data, optionally in combination with recycling at least a part of the previous reference data.

Note that methods according to the invention are not restricted to the above-exemplified steps and sequence of steps.

FIG. 7 illustrates a framework for hyperparameter optimization which may be utilized in embodiments of the invention. This hyperparameter optimization may for example be utilized in the method of FIG. 6.

The effect that different hyperparameters, pre-processing blocks, training of the learning-based algorithm, etc., has on the performance of the anomaly detection in general can be evaluated and optimized based on different evaluation tools, to determine the best anomaly detection; e.g. the anomaly detection that performs best for a given implementation of the invention. E.g. in an implementation of the invention, the anomaly detection may be optimized to achieve high sensitivity, whereas other implementation of the invention may require the anomaly detection to have a high accuracy and thereby is optimized with more weight given to accuracy parameters. Evaluation parameter that may be used to evaluate and optimize the anomaly detection of the invention comprises the area under the curve (AUC; Area Under Curve) of the receiver operating characteristics curve (ROC; Receiver Operating Curve), although other performance parameters may be utilized as well, according to the invention. An example of a different performance parameter that may be utilized according to the invention is the area under the precision recall curve.

The framework of FIG. 7 has a model optimizer 752 for supervised hyperparameter optimization of a semi-supervised anomaly detector (e.g. an anomaly detection block), which receives a training input 751 to optimize hyperparameters 754. The input comprises one or more machine learning algorithms 640, reference data of normal operation cycles 641, and anomaly data of anomality operation cycles 642. Initially, the machine learning algorithm 640 is used for model training in combination with the reference data of normal operation cycles 641. The training may for example lead to the establishment and optimization of an artificial neural network.

The trained model (e.g. a neural network) is evaluated in a scoring function 755 by supplying the anomaly data of the anomaly operation cycles 642. The scoring function evaluates whether the trained model is capable of identifying anomalies in the anomaly data of the anomaly operation cycles 642, and, optionally, also to which degree the model is able to distinguish each identified anomaly from the normal operation. Furthermore, the trained model is evaluated in an objective computation block 756, in which an objective of the model is evaluated. For an autoencoder, the objective may for example be to minimize a reconstruction error after encoding and decoding of reference data of normal operation cycles 641.

The evaluation is passed to a hyperparameter optimizer 757, which track the evaluation while changing hyperparameters to optimize the hyperparameters 754. When hyperparameters 754 have been changed by the optimizer 757, the model is trained again. This process may then be repeated iteratively, until optimal hyperparameters 754 have been identified. As illustrated, the framework may optionally output an output log 758, which comprises information indicative of the hyperparameter optimization.

The figure further shows a coupling between the model training 753 and the hyperparameter optimizer 757. This coupling indicates that the hyperparameter optimizer 757 may monitor and use output of the model training 753 or vice versa.

Generally, using supervised learning may increase the risk of a model being unable to recognize unknown anomalies. The semi-supervised learning illustrated here may ensure the unknown anomalies can be detected, while optimizing the model further than by using unsupervised learning.

Figures 8A, 8B, 8C, 8D:
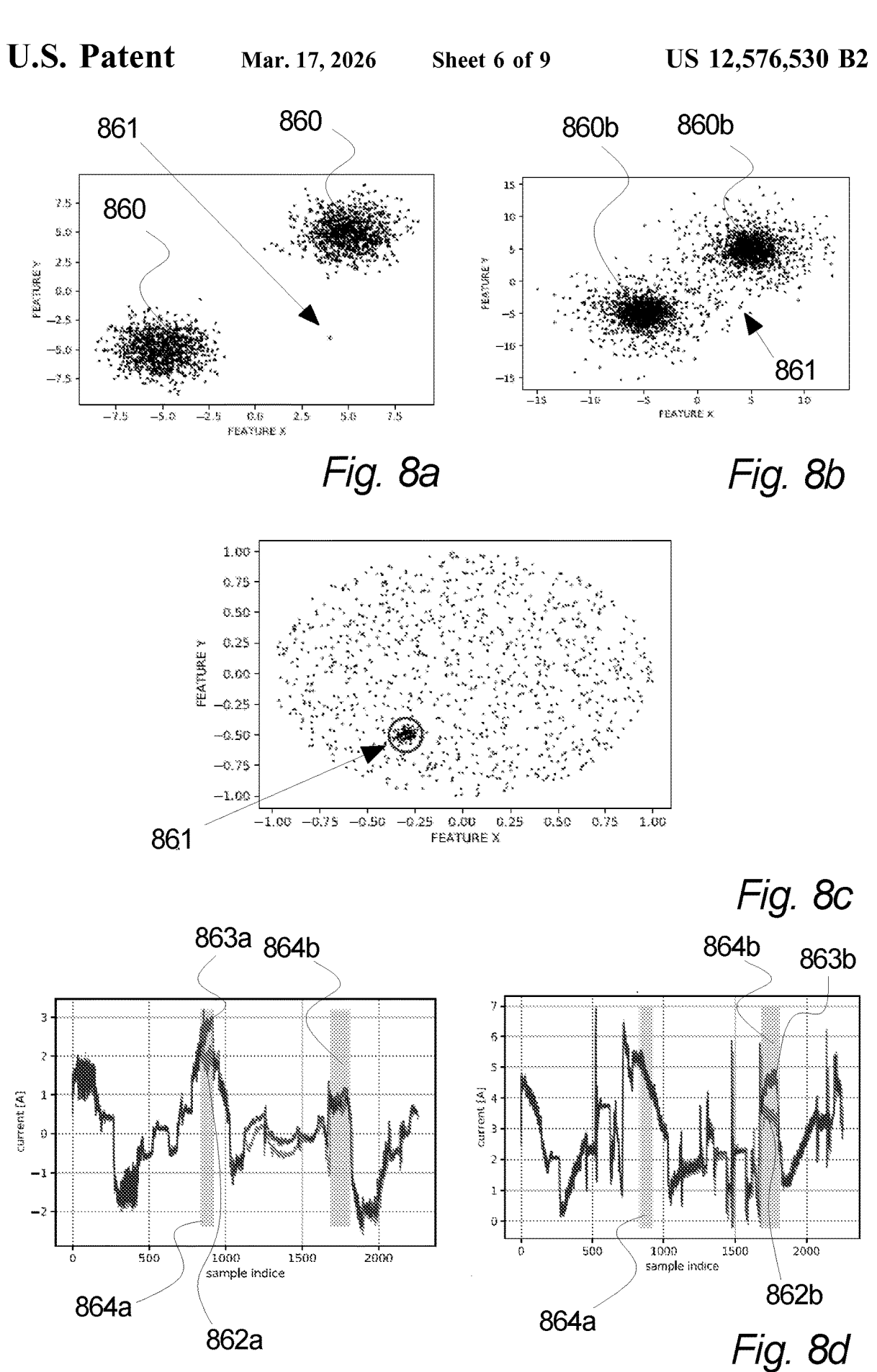
FIG. 8*a-c* illustrate examples of feature maps, including maps showing anomalous data.
FIG. 8*d* illustrates examples of graphs of joint motor currents obtained from a real-life operating robot during a scenario of normal operation and during a push anomaly scenario.

FIG. 8a-c illustrate examples of feature maps showing an anomalous data. These feature maps are constructed to visualize and ease understanding of the present invention. The FIG. 4d illustrates joint current features obtained from a real-life robot in operation exposed to a push anomaly.

The present invention relates to detection of anomaly by means of node conditions. In some embodiments, for the robot system to be able to detect such anomaly, reference data needs to be collected during the execution of the robot operation program. Several different methods can be used to perform the anomaly detection, and which is the best to some extend depends on the nature of the input data i.e. the collected data which also sometimes are referred to as robot operation parameters.

The following section describes the nature of the robot operation data, as well as different approaches to perform anomaly detection according to the invention, and according to the nature of the robot operation parameters.

FIG. 8a-c shows examples of graphical representations of two features FEATURE X, FEATURE Y plotted in a feature space/map against each other. The exemplary figures are conceptual visualizations of how robot operation parameters collected from an industrial robot may be distributed. The data is not from an actual implementation of the invention but serves to illustrate how various anomalies may appear in real data.

The illustrated features may represent information about the running robot operation which could be the robot joint positions and velocities. Such graphical representations can be considered a feature map. Notice that the feature map of FIG. 8a-c illustrates an example of the nature of the robot operation data, including anomaly data, and further illustrates that the problem of detecting an anomaly in such data may certainly require a sophisticated technical solution.

FIG. 8a illustrates a feature map comprising reference data 860 and a single point outlier reflecting anomaly data 861. In this example, the anomaly data 861 is easily distinguishable from the reference data 860, based on the two features X and Y.

FIG. 8b shows a feature map comprising noisy reference data 860b and anomaly 861. In this example, data points of the reference data 860b is positioned close to the anomaly data 861, which therefore cannot be considered an outlier relative to the reference data as easy as in FIG. 8a. In fact, if the anomaly 861 data was not highlighted, the anomaly data would not be easily distinguishable from the reference data 860b (at least not in the illustrated representation of data). Therefore, as an option, noise reduction may be applied in a pre-processing step of the invention, to establish less noisy reference data and less noisy robot operation parameters. However, utilizing more than two features (robot operation parameters) or even more features in the anomaly detection and the reference data, will in some cases make anomalies more distinguishable from reference data. With this said more features are not always the best e.g. if an anomaly is only visible in 1 out of 10 features it may be easier to identify than if it was only visible in 1 out of 100 features. Thus, optional advantageous implementations of the invention may perform anomaly detection even without requiring noise filtering of reference data and/or robot operation parameters.

FIG. 8c illustrates a plurality of collective outliers highlighted by the arrow 861. The collective outliers reflect anomaly data 861 that may not initially be distinguishable from the surrounding noisy reference data, but as more and more robot operation parameters are obtained during robot operation, the anomaly becomes evident because of the more constant nature of the anomaly relative to the noise surrounding the data reflecting the anomaly.

Although one outlier may indicate an anomaly, the outlier may also be the result of e.g. noise as illustrated. However, repeating outliers located at the same position in a feature space may substantiate that an anomaly is occurring or has occurred. Accordingly, advantageously, the anomaly detection of the invention may optionally evaluate time series data to detect an anomaly based on detection of collective outliers, which is advantageous.

Robot operation parameters, as exemplified by the data shown in FIG. 8a-c, may originate from a data pipeline consisting of multiple data generating processes that is reflected in the shown robot operation parameters (features)

X, Y. The data generating processes may typically be performed via the robot's sensors. The primary generating process is the robot application, which defines the systems normal behavior. However, other processes contaminating the data can be present, e.g., sensor noise, exogenous anomalies, and endogenous anomalies. These contaminating processes might be present in the data as single data instances or collections of data instances. The contaminating processes is important to appreciate, in order to achieve a well-functioning anomaly detection, since these contamination processes can obscure the evaluation of robot operation data, performed by the anomaly detection block to detect an anomaly, if the evaluation is not configured to handle the contaminating processes.

An outlier is a data instance that do not conform to the normal behavior of the system. Outliers may be indicative of an anomaly, however, outlier can also origin from contaminating processes and may be considered noise. Anomalies are typically categorized as deviations from the system's normal behavior and may originate from another data generating mechanism than the robot application. Anomalies in the context of robot applications include exogenous or endogenous anomalies. Endogenous anomalies may originate from data generating mechanisms within the robot, and exogenous anomalies may originate from generating mechanisms in the robot's environment.

FIG. 8d illustrates two examples of a representation of two joint motor currents joint 0, joint 1, obtained from a real-life operating robot during a scenario of normal operation 863a, 863b and during a push anomaly scenario 862a, 862b. The joint motor currents are examples of robot operation parameters, sometimes also referred to as features. In the push anomaly example, the two joint motor currents joint 0, joint 1 is acquired during a part of a robot operation cycle where the robot is pushed first at joint 0 and subsequently at joint 1, as graphically illustrated by two of the graphs 862a, 862b. The two other graphs 863a, 863b illustrate normal operation. The anomaly event is highlighted by the areas 864a, 864b. Notice that anomalies are not necessarily present in joint motor current obtained from both of the two joints joint 0, joint 1. In fact, generally not all features will typically be anomalous at the same time during an anomalous event. Further note that in this example, the deviation in joint motor current observed between the two robot operation cycles in the sample interval from 1100 to 1350 is a result of different pose estimations from simulated camera and these data are therefore not anomalous. This emphasize the challenges that some anomaly detection algorithm may encounter, e.g., some algorithms may be able to distinguish anomalies from such non-anomalous deviations in data, e.g. deviation in robot operation parameters relative to a reference data.

One way of describing data instances is by a d-dimensional feature vector. A data instance should be understood as a data such as robot operation data received by the robot controller reflecting the operation of the robot. The data comprised by a data instance may be referred to as a feature vector (sometimes simply referred to as a feature). The individual features can be of different types, e.g., binary, categorical, and continuous. The feature type, or combination of feature types, determines which anomaly methods are applicable since some methods are designed for specific data types. Additionally, the nature of the features will also determine which methods are appropriate, e.g., if the features follow a particular distribution, some methods can exploit this.

In the embodiment of an autonomous mobile robot or a collaborative robot arm, data will typically arrive/be collected in a data stream which implies that the data instances are temporally related. This type of data stream is sometimes referred to as a streaming time series. Hence a streaming time series is a sequence of temporally ordered data instances which are sampled online.

A simple way to consider the data instances is by assuming they are independent of each other. In this case, the data instances are instances in a d-dimensional feature space, where there is no relation between them. Hence, data instances are considered independent when there is no defined relationship between them. Most anomaly detection methods are designed to operate with this type of input data.

In FIG. 8a-c, examples of outliers are shown in a 2-dimensional feature space for feature X and feature Y. Feature X and feature Y could e.g. refer to values reflecting a torque at two different joints of the robot system of the invention, e.g. of a joint of a robot arm. Notice that the feature space may most often include a larger number of features and therefore a larger dimensionality feature space. The datapoints (the dots) illustrates robot operation parameters sampled during operation of the robot system of the invention. This could e.g. be the mentioned values associated with torque.

Again, the datapoints illustrated in FIG. 8a-c illustrates robot operation parameters also sometimes referred to as features obtained during operation of the robot arm. The data points, which is not marked as anomaly data 861 in this example, are those which may e.g. be utilized to establish a reference data/is defined as reference data. E.g., a dataset comprising robot operation parameters sampled when the robot operates without anomalies. As shown in FIG. 8a-b, the most frequently obtained datapoints tend to gather in clusters. Thereby, according to the invention, an outlier may be defined with reference to these clusters. Advantageously, according to the invention, the clusters may be utilized to define the reference data comprising e.g. normal robot operation data.

As mentioned, in FIGS. 8a and 8b, the anomaly data 861, and those datapoints encompassed by the circle as illustrated in FIG. 8c are defined as outliers relative to the other datapoints, and therefor is indicative of an anomality or a possible anomality. In the terminology used in this document, the datapoints represents robot operation data obtained or sampled at a plurality of discrete times (or continuous) during operation of the robot. If at one point in time/one sample, the datapoint highlighted by the arrow is obtained, and this datapoint is positioned at a distance of more than a specified threshold from the part of the robot operation data that is defined as reference data, this datapoint may be defined as an outlier, which may be indicative of an anomality.

Optionally, one target of the anomaly detection is to apply an outlier score to (preferably) all data instances that describe how anomalous they are. With this said, data instances could also be segmented into sequences, such that a score is applied to each sequence instead of each data instance.

In other words, the anomaly detector expresses its disbelief of each data instance as belonging to the normal behavior of the robot and its application by returning an outlier score. The outlier scores may for example be in the interval from zero to infinity, where the scores that are approximately zero are considered normal and the scores $s\_i \gg 0$ are considered outliers indicative of anormal operation. A threshold can be used to create a hard boundary between the normal data instances and the outliers. Some anomaly detectors are able to perform collective anomaly detection to only create detections when a collection of data instances is anomalous, which reduces the noise sensitivity of the detector, while other methods might require postprocessing to ensure that only detections are created when multiple data instances are anomalous.

To determine if an outlier is in fact an anomaly and not e.g. a result of noise, various methods may be applied according to different implementations of the invention. The methods may advantageously include machine learning methods such as supervised learning, unsupervised learning, semi-supervised learning and reinforcement learning. However, other implementations of the invention could utilize different methods, including empirically determining one or more thresholds above or below which an outlier is deemed an anomaly. It should be mentioned, that a threshold typically cannot be used to determine if an outlier is resulting from noise or from an anomaly. The threshold is mainly used to determine when a data instance is an outlier. To increase precision in the determination of the existence of an outlier, e.g. collective anomaly detection may be applied i.e. reducing the number of data instances that occur from noise being classified as anomalous.

It should be mentioned that a threshold may not always be suitable to determine if an outlier is resulting from noise or from an anomaly, such as e.g. an exogeneous anomaly. The threshold can typically be used to determine when a data instance is an outlier. To increase precision in the determination of the existence of an outlier, e.g. collective anomaly detection may be applied i.e. reducing the number of data instances that occur from noise being classified as anomalous.

The one or more thresholds may also be determined via simulations of operation of the robot system and the simulations may comprise anomalies and normal robot operation. The threshold could also be manually selected or selected based on one or more of the mentioned machine learning approaches or based on any combination of the mentioned methods.

In an implementation of the invention, the threshold is e.g. determined as a distance to the centroid of clusters representing normal operation of the robot system in a feature space, such as the feature spaces illustrated in FIG. 8a, 8b, e.g. the centroids of the clusters of a reference data representing normal operation of the robot system. The value or size of the "distance" may vary among robot systems, robot arms, autonomous mobile robots, peripheral devices, etc. it may be determined by the quality or requirements to the work done by the robot. Hence, the actual value or size depends on the application, the feature, the node, and other factors. Particularly, according to the invention thresholds may vary between different program nodes.

The actual value of the threshold depends on the degree of allowed variance in the robot application that has been captured by the anomaly detector. Furthermore, it also depends on multiple other factors such as choice of features, the anomaly detector, etc. The thresholding can also be performed locally where multiple thresholds are learned and used depending on the robot's subtask.

Methods such as k-means clustering may be applied to define the clusters including the centroids of the clusters. However, different and/or more advanced methods may also be applied, e.g. depending on the implementation of the invention and the computational power of the controller of the robot system.

The data used for anomaly detection may as mentioned include robot operation parameters collected from e.g. a robot arm. This data can be split into two overall feature categories, which are referred to as contextual and behavioral features. The contextual features define the context of an instance and the neighborhood of an instance e.g. time is a contextual feature in streaming time series. These features are referred to as being independent since the robot system cannot affect them and, in the following, e.g. time and program node information may be considered a contextual feature.

The behavioral features on the other hand are all the features that are not a contextual feature. I.e., these features are used to describe the robot system's behavior, including e.g., joint currents. These features are referred to as being dependent on the robot system (or peripheral devices) since the robot directly affects these features.

A contextual method can determine if an instance is anomalous by inspecting the behavioral features within a neighborhood specified by the contextual features. The anomalies identified based on a specific context are referred to as contextual anomalies; an example of such an anomaly type is during the summer months, it might not be unusual to experience temperatures of 25° C., while this temperature might be very unusual during the winter months. In this case, the seasons define the context, and the temperature is considered a behavioral feature. Contextual anomaly detection methods may thus be understood as methods that use a contextual feature to perform anomaly detection. E.g. when treating the data as sequential the contextual feature could be its position in the sequence or a timestamp that can be used to establish a temporal neighborhood. Contextual detectors might be able to detect anomalies that are only visible when treating the data locally by inspecting the data instances in an established context.

Contextual anomaly detection methods are all methods that use a contextual feature to perform anomaly detection. E.g. when treating the data as sequential the contextual feature could be its position in the sequence or a timestamp that can be used to establish a temporal neighborhood. Contextual detectors might be able to detect anomalies that are only visible when treating the data locally by inspecting the data instances in an established context.

The robot operation parameters may for example be internal operation parameters. Internal operation parameters may for example be understood as any parameters obtained by the industrial robot, e.g. by its own sensors. Internal operation parameters may further comprise parameters outputted by the robot controller, indicative of operation of the industrial robot. Internal operation parameters may also comprise interoceptive parameters. Examples of internal operation parameters are (actual and target) joint positions, joint velocities, joint/motor currents, coordinates and orientation of the tool, temperatures, robot mode, tool mode, payload mass (as measured by the robot), etc. In some embodiments, robot operation parameters may further comprise external operation parameters, e.g. from external sensors or cameras.

Irrespective of whether features e.g. robot operation parameters, are contextual or behavioral, the anomaly detection model that performs the anomaly detection, can be allowed to use all available data instances (i.e. input data including robot operation parameters), both for anomaly detection and for training of the anomaly detection model. However, redundancy may occur in the robot operation parameters with regards to anomaly detection, and thereby, the anomaly detection models operated by the anomaly detection block may potentially have access to more data than necessary. To reduce the demand for processing power and memory, redundant robot operation parameters may optionally be omitted from the anomaly detection using feature selection. This is advantageous in that it reduces the demand for processor power and memory of the anomaly detection. This may in turn enable the robot controller to perform both operation of the robot and anomaly detection.

The optional step of performing feature selection is applied to select only a specific subset of the robot operation parameters that provide the most sensitive and accurate anomaly detection. In other words, feature selection keeps the features most closely related to anomalies, while removing redundant features. When operating the robot in one context, one set of features may be used and when operating the robot in a second context, a second set of features may be used. When operating the robot in one context, one set of features may be used and when operating the robot in a second context, a second set of features may be used. Non-limiting examples of such methods that may be utilized according to the invention comprises backward elimination, forward selection, or tree-based models, including e.g. random forest. Other feature selection methods and/or combination of feature selection methods can be applied, depending on the implementation of the invention. Similar to dimensionality reduction, reducing the number of features reduces the number of different robot operation parameters that needs to be processed to perform anomaly detection.

According to the invention, different learning-based anomaly detection methods may be used e.g. by the anomaly detection block, to evaluate input data including robot operation parameter to detect an anomaly. The methods utilize the input data, also mentioned as the so-called features, to detect an anomaly. As mentioned, the features can be a subset of robot operation parameters or all robot operation parameters.

The learning-based methods that may be implemented according to the invention include at least supervised, unsupervised, semi-supervised and reinforcement learning methods. In some applications, the methods can be combined to achieve e.g. improved accuracy and/or efficiency, and/or the ability to detect particular types of known anomalies, while in addition utilizing the flexibility to of e.g. unsupervised learning to also detect unknown anomalies.

Supervised methods assume labelled robot operation parameters for all possible instances belonging to both normal and anomalous behavior and that all anomaly types that the system should be able to detect are known at training time. These requirements are often hard to meet for anomaly detection tasks. Furthermore, the datasets in anomaly detection tasks are imbalanced, given the rare nature of anomalies, which can be problematic for many supervised methods. Nevertheless, some implementations of the invention may advantageously utilize supervised learning methods for anomaly detection. Advantageously, supervised learning methods may e.g. be utilized in implementations of the invention where it is of high priority to identify one or more known anomalies. The main purpose of using the supervised learning algorithm is to categorize the anomalies detected by the anomaly detection block in fault categories and/or to detect known anomalies.

The supervised learning methods may comprise different types of classifiers able to classify an anomaly based on robot operation parameters and reference data. Generally, a classifier may be understood as any algorithm that sorts data into labeled classes, or categories of information. Some examples of supervised learning methods that can be implemented, e.g. on the robot controller, to detect an anomaly based on robot operation parameters and (optionally) reference data comprises e.g., support vector machine models, probability-based models, Bayesian models, different types of decision trees including random forest. E.g. a Naïve Bayes model may advantageously be utilized in implementations of the invention where the amount of training data and/or processing power is limited, since this algorithm can deliver good performance with limited training data.

Unsupervised methods do not assume the availability of labelled data. Instead, these methods are typically based on the assumption that normal instances are more frequent than anomalous instances. One problem with some unsupervised methods is that they may not exploit all available prior knowledge. Various kinds of unsupervised methods may be applied in different implementations of the invention. E.g. different clustering methods can be implemented and/or different unsupervised classifiers can be implemented, to perform anomaly detection based on robot operation parameters and reference data. Non-limiting examples of unsupervised anomaly detection methods that can be utilized in implementations of the invention is k-means, k-nearest-neighbor, local outlier factor, one class support vector machine, isolation forest, methods based on multivariate Gaussian probability, and local covariance.

In addition, different types of neural networks can also be implemented, including e.g. auto encoder networks and time series prediction-based neural networks, to name a few. Other neural network architectures can also be utilized for anomaly detection, depending on specific implementations of the invention. Neural networks are preferred in implementations of the invention where the amount of available data, such as training data is high, since given large amounts of training data, the neural networks may deliver superior performance and accuracy of the anomaly detection, compared to simpler learning-based approaches. Examples of neural networks and/or deep learning that may advantageously be applied in implementations of the invention comprises convolutional neural networks, artificial neural networks and recurrent neural networks.

Neural networks may be implemented as unsupervised learning, supervised learning or semi-supervised learning depending on the given implementation of the invention. Some implementations of neural network-based anomaly detection can optionally comprise a softmax function. In an implementation of the invention, softmax functions are positioned in the layer just before the output of the neural network. Advantageously, the softmax function normalizes the outputs of the previous neural network layer and converts them from weighted sum values into probabilities that sum to one. Each value in the output of the softmax function is interpreted as the probability of membership for each class. The classes may e.g. comprise different anomalies and 'no anomaly' or it may simply be 'anomaly' or 'no anomaly'.

According to an implementation of the invention, an auto encoder network may preferably be utilized for anomaly detection based on robot operation parameters. The autoencoder is efficient, and thereby can optionally be implemented on the robot controller to perform anomaly detection based on robot operation parameters. The autoencoder is trained using the reference data and backpropagation. Implementations of the invention that utilizes an autoencoder may advantageously detect exogeneous anomalies based on robot operation parameters obtained from the robot, while not requiring additional sensors external to the robot.

Semi-supervised methods are a mixture of the supervised and unsupervised methods learning settings since it only assumes the availability of labels for the normal class, e.g. in the reference data, robot operation parameters obtained during normal robot operation is labelled as normal class. Thereby, the semi-supervised methods are able to create a model of the normal behavior of the robot or of the robot system and report all nonnormal instances as anomalous, which is advantageous.

Advantageously, the anomaly detection of the invention can also be formulated as a reinforcement learning problem, where an autonomous agent interacts with the environment and takes actions and gets rewards from the environment (e.g. positive rewards for correct predictions of anomaly and negative rewards for wrong predictions), and over a period of time learns to predict anomalies with a high level of accuracy. An example of an action could e.g. be to flag or not-flag an anomaly detection warning.

Contrary to supervised learning methods, reinforcement learning methods does not e.g. require training based on labelled input/output pairs. Implementations of the invention based on reinforcement learning advantageously enables the anomaly detection to improve its performance over time based on input from an operator of the robot/robot system. E.g. in the event that an anomaly was not detected by the robot system, but detected by the operator, the operator may inform the anomaly detection via the user interface, and based on this input, the anomaly detection learns to recognize such an anomaly and thereby becomes capable of detecting that anomaly should it occur again.

The above-mentioned learning-based methods may for example be trained on reference data obtained during operation of the robot/robot system. Advantageously, when reference data is updated or extended, training can optionally be conducted on the new training data to improve the performance of the anomaly detection. Training is a prerequisite for the learning-based methods to function as intended. E.g. if a neural network classifier is applied to perform the anomaly detection, the training may be performed using backpropagation. Training of the methods, in particular of the algorithms, is typically performed using the robot controller, however, in some embodiments of the invention, the training may be performed on a separate controller. When one or more learning algorithm has been trained on an external device such as an external computer or controller, the trained algorithm can optionally be installed on the robot controller to perform anomaly detection.

If a number of robots are to perform the same task based on the same program, then the training of the anomaly detection block does only have to be made on one robot and then the trained anomaly detection block/algorithm can be copied to the remaining robots. In fact, the training may be performed external to any of the robots by a simulation or test setup and subsequently the trained anomaly detection block/algorithm can be copied to the robots. Optionally, such training may be supplemented by adjustment of the trained anomaly detection block to the individual robots, e.g. be performing further training on the individual robots.

Optionally, if a supervised learning-based anomaly detection is implemented, the training may preferably be performed utilizing reference data comprising exogenous anomalies. The reference data may comprise robot operation parameters of the robot and data acquired with sensors measuring the surroundings, such as cameras. Advantageously, the anomaly detection of the invention may therefore detect exogeneous anomalies without requiring external sensors including recognition systems, such as e.g. cameras and/or image recognition systems.

An exogenous anomaly may refer to something outside the robot i.e. outside the robot arm or autonomous mobile robot that is not normal. This may include unexpected workpiece, force applied to the robot, etc. An endogenous anomaly is a reference to something inside the robot arm that is not normal. This may include unexpected temperature, current, etc.

It should be mentioned that it may be possible to define reference data manually e.g. via a user interface of a robot controller. Such manually defined reference data could e.g. be minimum or maximum limits. Defining reference data i.e. the so-called normal robot operation parameters manual is advantageous in that it has the effect, that the training phase of the algorithm of the anomaly detection block is reduced. Manually should here include specifying ranges, values of robot operation parameters both from values obtained from sensors during operation of the industrial robot or values for such robot operation parameters specified manually.

Further, it should be mentioned that it may be possible to define anomaly data. Anomaly data is data that defines an anormal operation of the robot i.e. a specific anomality that the anomaly detection block should be looking for and/or optimized towards.

As illustrated in FIG. 8b, the sampled robot operation parameters may be contaminated with noise, such as e.g. electromagnetic interference and radio frequency noise. Hence, a robot sensor may e.g. provide noisy robot operation data. Thus, depending on the specific implementation of the invention, the performance of the anomaly detection may be compromised by noise and therefore the anomaly detection may advantageously be improved by including e.g. noise reduction, e.g. by noise filtering. Denoising may also be handled by the anomaly detection method, e.g. by training the method on intentionally noise-impacted reference data.

To further improve the performance of the anomaly detection, reduce the processing power and memory required for anomaly detection, ensure desired dynamic range, etc. further pre-processing steps can be performed, including, dimensionality reduction, standardization, min-max normalization, etc.

Figure 9:
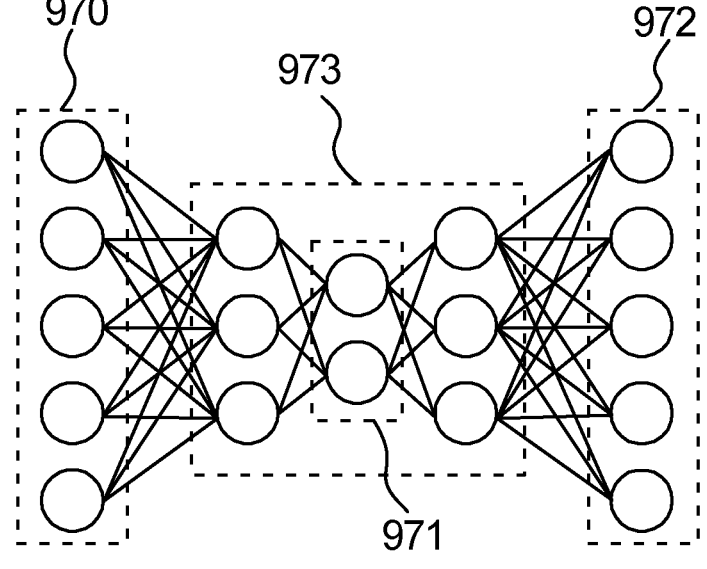
FIG. 9 illustrates a specific example of a system for detecting an anomaly according to an embodiment of the invention.

FIG. 9 illustrates a specific example of a system for detecting an anomaly according to an embodiment of the invention.

The anomaly detection performed by the anomaly detection block. One way is using an instance-based anomaly detection method including e.g. local outlier factor (LOF), which performs robustly across many introduced anomalies. Instance-based methods, however, demands a lot of processing power and/or data memory in order to function. Typically, more than one gigabyte of memory is required, and therefore these methods may not necessarily be well suited for running on a robot controller, whereas they can be used for anomaly detection using separate controllers comprising more memory and/or processing power.

To mitigate the problems of the instance-based methods such as local outlier factor, preferable implementations of the invention may utilize autoencoders, capable of performing anomaly detection while optionally enabling using the robot controller while leaving enough memory and processor power to enable the robot controller to continue control of robot operation.

FIG. 9 illustrates an autoencoder network configured for anomaly detection, according to an embodiment of the invention. The autoencoder has a symmetrical structure and thereby an equal number of nodes (may also be referred to as neurons or perceptrons) in the encoding part of the network and in the decoding part of the network. In this example, the autoencoder comprises an input layer 970 with five nodes, a latent layer 971 with two nodes and an output layer 972 comprising five nodes. The hidden layers 973 of the network comprises one hidden layer with three nodes between the input layer 970 and the latent layer 971 (the encoding part of the network), and one hidden layer with three nodes between the latent layer 971 and the output layer 972 (the decoding part of the network). The autoencoder receives robot operation parameters at the input layer.

The autoencoder may be trained based on the reference data using backpropagation, and thereby learns to encode the reference data in such way that the latent layer represents the essentials of the reference data, while the output of the decoding part of the autoencoder decodes data from the latent layer, in such a way that the output of the decoding part of the autoencoder best represents the reference data fed to the input layer of the autoencoder. The autoencoder thereby learns the normal behavior of an operating robot system.

In this example, the autoencoder learns the normal behavior of an operating robot system by training on reference data acquired during a normal operation of the robot system. Hence, in this example the reference data represents normal robot operation. When the robot is operated and the anomaly detection autoencoder has been trained, and the autoencoder receives data acquired during an anormal robot operation, the output of the autoencoder is no longer similar to the input received by the autoencoder at the input layer. This difference occurs because the autoencoder was trained to encode and decode normal operation data (reference data), and thereby, the output of the autoencoder is not able to accurately represent the robot operation parameters received at the input layer of the autoencoder. The difference between the output of the autoencoder and the received input (robot operation parameters) is then utilized to determine the presence of an anomaly.

In this example the Euclidian distance between the input received by the input layer, and the output of the output layer of the autoencoder is utilized to quantify an anomaly, e.g. quantify degree of abnormality. The Euclidean distance between the input to the network (the original data instance) and the output of the network (the reconstructed data instance) can be used as an outlier score, since it expresses how well the data instance fitted into the autoencoder's learned model of the normal behavior. To explicitly classify a data instance as an outlier an appropriate threshold is used as described above, which can be learned through techniques such as Median Absolute Deviation (MAD). By computing the MAD from outlier scores computed for data representing the normal behavior, a boundary can be established of how much error is allowed during a forward propagation of data instances in the neural network.

However, other measures of difference between the input and the output of the autoencoder may be utilized in different implementations of the invention. These may include but are not limited to distance-based measures such as Manhattan distance, Chebyshev distance, Mahalanobis distance, etc., or angular measures such as Cosine similarity, etc.

As mentioned, the autoencoder structure can intuitively be understood as having an encoder network, which encodes the original feature vector into a latent feature space, and a decoder network that maps instances from the latent feature space to the original feature space:

$$x^\wedge = d(e(x)),$$

where e( ) symbolize the encoder network, d( ) symbolize the decoder network, x is the original data instance, and x^ is the reconstructed data instance.

During the training process, the autoencoder deconstructs the data instances by transforming them into the latent feature space, the latent layer 971 and then reconstructs the data instances by transforming them back into the original feature space, the output layer 972. The reconstruction error is minimized during the training phase to learn a locally optimal representation.

Optionally, when trained, the anomaly detection may utilize the reconstruction error of the autoencoder directly for computing outlier scores and based on these detect an anomaly.

In general, it should be mentioned that an overall purpose of anomaly detection methods (sometimes referred to as algorithms) may be to return an output score, which provides information of how anomal a data point (or a set of data points) is.

Optionally, the autoencoder may be extended with additional neurons and hidden layers.

Figure 10:
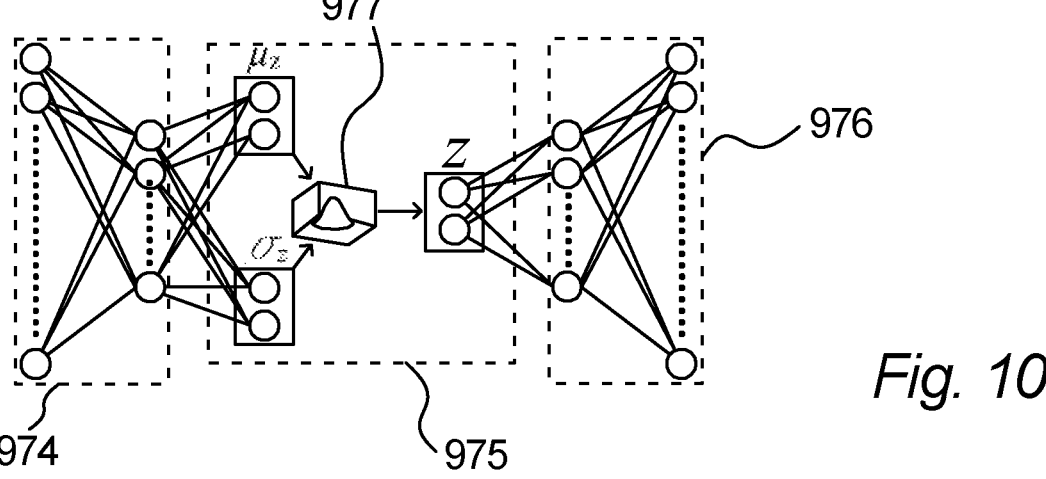
FIG. 10 illustrates another specific example of a system for detecting an anomaly according to an embodiment of the present invention.

FIG. 10 illustrates a variational autoencoder network according to an embodiment of the invention. The variable autoencoder comprises an input layer of X nodes (also sometimes referred to as encoder) 974, a latent layer of Y nodes 975 and an output layer comprising Z nodes (also sometimes referred to as decoder) 976.

In this example, the Variational autoencoder structure can be considered as a probabilistic extension to the autoencoder structure illustrated in FIG. 9, which may improve accuracy and sensitivity of the anomaly detection. The variational autoencoder structure learns a distribution of the latent features instead of mapping directly to the latent features as done by the autoencoder illustrated in FIG. 9. The input 974 and output portions 976 of the variational autoencoder in this example could thus have been designed with the same number of nodes as the input and outputs of the autoencoder illustrated in FIG. 9. Depending on the specific implementation, number of robot operation parameters given as input etc., the number of nodes in each layer may vary, and also, the number of layers in each portion of the network may vary. Increasing the number of nodes and layers, may enable the network to model increasingly more complex data to achieve improved performance, however, at the cost of requiring more processing power and memory. In this example, the input portion 974 and the output portion 976 of the network comprises two layers.

The latent features of the latent portion 975 of the network are described by the approximate posterior distribution 977, q(z|x):

$$z \sim q(z \,|\, x) = \mathcal{N}\big(\mu_z,\, \sigma_z^2 I\big).$$

As seen in the above equation, the approximate posterior distribution is chosen to be a Gaussian in this example, and with a diagonal covariance. During a forward pass of the variable autoencoder, a sample is being drawn from the approximate posterior distribution by using random noise $\epsilon$:

$$z = \mu_z + \sigma_z \cdot \epsilon, \; \epsilon \sim \mathcal{N}(0, I).$$

The sampled latent variables are then passed through the decoding portion of the network, the output portion 803, which maps them into the original feature space. The loss function is defined as sum of the reconstruction error and a regularization term:

$$\mathcal{L} = \mathbb{E}_{z \sim q}[\log p(x \mid z)] - D_{KL}(q(z \mid x) \| p(z)).$$

The Kullback-Leibler (KL) divergence between the variational distribution and a prior distribution, DKL(q(z|x)‖p (z)), is acting as a regularizer. The prior distribution of the latent features is chosen as a standard Gaussian distribution, p(z)=N (0, I), since this allows for differentiating the KL divergence without approximations. The first term, Ez~q[log p(x|z)], is the expected reconstruction loss and requires estimation by sampling.

Optionally, variational autoencoder may be extended to learn the variance of the reconstructed data and approximate a multivariate normal distribution instead of directly mapping to a single instance in the original feature space. This enables more precise computation of the reconstruction error. Advantageously, this may improve accuracy and sensitivity of the anomaly detection, while keeping processor and memory requirements at a level where the method can still be performed by the robot controller, while the robot controller is also controlling operation of the robot system. By this implementation, the network can directly compute a log-likelihood probability used in the loss function. The autoencoder structure is referred to as a one-Pass variational autoencoder (OPVAE; One-Pass Variational Autoencoder), to emphasize its advantageous ability to provide probabilistic outputs, using a single forward pass.

Optionally, the autoencoder may be optimized using hyperparameter optimization. In this example the autoencoder is optimized utilizing hyperparameter optimization utilizing reference data representing normal behavior of the robot system, together with a learning rate of α=0.0005 and the Rectified Linear Unit activation function for intermediate layers, such as e.g. hidden layers. To model an arbitrary latent space, a linear activation function for latent space description is utilized, while regularizing through the KL divergence. A softplus activation function is used to restrict the approximated output variance of xi to σ (i)×∈R+. In this particular example a batch size of 128 is used to train the network for each iteration. Note, that other batch sizes may naturally be chosen. However other implementations of the invention may utilize a different batch size. In one embodiment, the batch size is above 100, to makes it appropriate to directly use the log-likelihood probability for approximation of the expected log-likelihood.

Optionally, the variational encoder may be implemented as a deep hybrid model, to exploit the representation learned by the above described one-pass variational encoder and indirectly exploit information from the program node ID, to improve accuracy and sensitivity of the anomaly detection. The deep hybrid model may e.g. be implemented as a variable autoencoder utilizing with Gaussian Mixture model. Advantageously, this improves accuracy and sensitivity of the anomaly detection autoencoder. In particular, features of the latent space (the latent layer), so called latent features, cluster themselves based on their program node ID. The deep hybrid model may exploit this by performing clustering in the latent space of the OPVAE and provide the outlier score as the log-likelihood of fitting into a cluster in the latent space. In particular, a Gaussian Mixture Model (GMM; Gaussian Mixture Model) with the same number of modes as the number of program node IDs can be implemented, e.g. under the assumption that the data instances map into clusters in the latent space of OPVAE based on which program node ID they are gathered under.

Since the data instances potentially clusters in multiple modes in the latent space for each program node ID, the number of clusters may be increased. As an example, scikit-learn's default parameters are utilized for the GMM, where the k-means algorithm is used to initialize centroids and the expectation maximization algorithm in an embodiment terminates when the change in log-likelihood is less than 10e-3 or when the expectation maximization algorithm reaches 100 iterations. Again, as other values, thresholds, etc. mentioned in this document, these are just examples and can obviously be changed according to the specific scenario, anomality or other reasons.

Advantageously, this optional implementation of the invention may improve the performance of the anomaly detection yet keeping memory and processor requirements of the anomaly detection at a desired level, whereas the robot controller may both control operation of the robot and perform anomaly detection.

Optionally, the one-pass variable autoencoder structure may be extended to a conditional variational autoencoder, which advantageously enables incorporation of contextual information. An example of a contextual feature that provides information about the subtask running on the robot, e.g., a move command is program node ID. Thereby, the behavioral features can be considered a function of the known program node ID and other unobservable variables. In an implementation of the invention a CVAE (CVAE; Conditional Variational Autoencoder) can be implemented to incorporate the program node ID's contextual information. The program node ID is considered a categorical feature, which is provided as a one-hot encoded vector of size equal to the number of defined node IDs for the network since we are not interested in the program node ID's specific value. Other implementations of the invention may utilize different methods for encoding the program node ID.

Irrespective of which type of autoencoder that is implemented, the autoencoder can be optimized according to various hyperparameters, including e.g. one or more of the list comprising: learning rate, number of neurons in each layer of the autoencoder network, number of encoding layers, number of decoding layers, choice of activation function, batch size, number of epochs, etc.

Optionally, the performance of the autoencoder with regards to anomaly detection can be optimized by optimizing hyperparameters associated with the model, using e.g. the hyperband method. Notice that it is within the scope of the invention to utilize other not mentioned methods for hyperparameter optimization.

Figure 11:
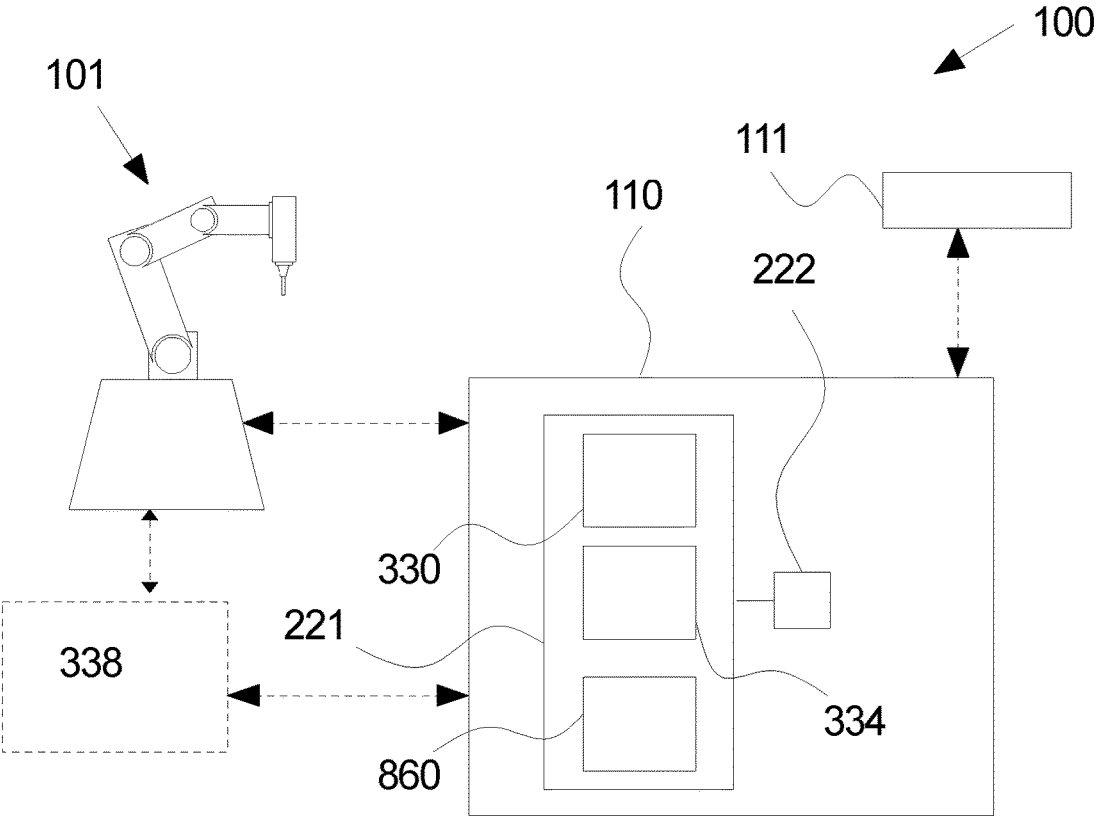
FIG. 11 illustrates an industrial robot capable of performing anomaly detection according to an embodiment of the present invention.

FIG. 11 illustrates a robot system 100 comprising an industrial robot 101, a robot controller 110 capable of performing an anomaly detection, and an interface device 111. The illustrated parts of the robot controller 110 are a data processor 222, a robot operation program 330 comprising program operation parameters. The robot controller is configured to obtain one or more robot operation parameters based on/related to operation of said industrial robot according to the robot operation program and/or program operation parameters. The robot operation parameters acquired from the robot system may in this document be referred to as data features. Further FIG. 11 illustrates an anomaly detection block 334, reference data 860, and a memory 221 wherein the robot operation program 330, the anomaly detection block 334 and the reference data 860, is stored.

Further FIG. 11 illustrates a safety block 338 that is communicating/monitoring the robot arm 101 and the controller 110. The safety block includes a safety controller the purpose of which is to stop operation of the robot arm 101 to avoid hazardous situations if not the robot controller 110 for some reason prevents that.

Note that some of the illustrated parts are hardware elements such as the processor 222 and the memory 221 and some are software elements such as the robot operation program 330 and the anomaly detection block 334. Note that other not illustrated parts may also be comprised by the robot controller 110 and that the individual parts may be physically implemented in the same or in different enclosures.

In the present context, the expected behavior of the industrial robot, such as the robot arm illustrated in FIG. 1 or a not illustrated autonomous mobile robot (both types sometimes referred to simply as robot), is defined by the robot operation program 330 controlling the robot operation when executed by the processor 222 of the robot controller 110. With this said, due to tolerances, change in objects to be handled by the industrial robot, peripheral devices, etc., the robot operation parameters may vary from cycle to cycle, although the robot operation program is the same.

The interface device 111 may be a teach pendent via which a user can access the robot operation program 330, program operation parameters, and others including obtained data from and provide data to the industrial robot 101 or its surroundings. The dashed lines illustrate that bidirectional data communication is possible between robot controller 110 and the industrial robot 101 and between robot controller 110 and interface device 111. The bidirectional data communication is a wired connection, however, in other implementations the data communication could be a wireless data communication.

During operation of the robot, the robot controller 110 receives robot operation parameters from the industrial robot 101. These may include a multiple of different information about the robot and even potentially about the surroundings of the robot based on sensors measuring parameters associated with the surroundings of the robot.

According to an embodiment of the invention, an operator (not shown) manually initiates a commissioning of the industrial robot 101, by instructing the robot controller 110, via the interface device 111, to execute the robot operation program 300 using the processor 222. Hence, during e.g. a commissioning period, prior to including the robot e.g. in production, the robot is operated e.g. as intended in production to ensure that the industrial robot 101 operates a task as specified by the robot operation program 330, and further has the purpose of establishing the reference data 860.

Alternatively, the reference data can be established any time during the production, preferably during the first period after the robot has been included in production. Hence, the anomaly detection of the present invention can be applied to already existing robots i.e. an existing robot can be retrofitted with the anomaly detection according to the present invention. The number of cycles needed varies from a few such as e.g. between 10 and 20 cycles to several hundreds or even several thousands of cycles. The number of cycles may depend on the anomaly one is looking for, the complexity of the robot system/robot program, robot application, anomaly detection method, etc.

Continuing the commissioning example, after initiating the commissioning period, the operator then monitors the operation of the robot for a plurality of cycles such as between 10 and 1000 cycles e.g. 500-600 cycles. In this period, the operator checks that the robot is operating as intended, and as defined by the robot operation program 330. During the cycles of the commissioning period, the robot controller 110 receives robot operation parameters from the industrial robot 101 and/or its surroundings. In a specific example, the industrial robot is a robot arm such as the robot arm 101 illustrated in FIG. 1, and the received robot operation parameters include robot joint positions and velocities of the robot arm. Based on these parameters, the robot controller 110 establishes reference data 860, which is stored in the memory 221 of the robot controller 110. When the operator determines that the robot has operated as intended during the commissioning period, the operator informs the controller via the interface device 111 that the commissioning was successful, and the reference data 860 is then considered to reflect normal operation of the robot.

Alternatively, the unsupervised, semi-supervised or supervised (for known anomalies) fault detection algorithm of the anomaly detection block 334 can automatically determine when sufficient normal data has been acquired to establish the needed reference data. One way for the anomaly detection block to do so is monitoring the robot operation data in subsequent operation cycles and when the received robot operation data is similar, or close to similar, in each cycle it can be defined as reference data reflecting normal operation of the robot.

If the operator identifies anomalies during the commissioning period, the operator may solve the one or more causes of the anomaly, and then afterwards perform a new commissioning period to obtain a reference data that is not associated with any anomaly detected by the operator. Optionally, the operator may choose to mark the cycles of operation associated with the anomaly, and then the robot operation parameters associated with these cycles may be removed from the reference data, and/or be labelled as anomaly data. Optionally, anomaly data may in some implementations be utilized in the training of e.g. a supervised fault classification algorithm added to/built on top off of the anomaly detection block.

In general, it should be mentioned that the anomaly detection block 334 comprises an un-supervised or semi-supervised anomaly/fault detection algorithm/method used to determine if an unknown anomaly is present. A supervised anomaly/fault detection algorithm/method may be used to detect a known anomaly. The supervised fault/anomaly algorithm may in addition be used to classify the detected anomalies into (pre-) determined classes such as collision at robot link, collision at robot tool. Deviation from usual working area etc.

Do appreciate that the anomaly/fault detection algorithm/method may not necessarily be built on top of the anomaly detection block, since in some embodiments, it may also be comprised by the anomaly detection block and be used to detect one or more known anomalies, including e.g. the mentioned (pre-) determined anomalies, without relying on e.g. a further anomaly detection algorithms/methods.

After a successful commissioning period, operation of the industrial robot 101 can be initiated to let the robot perform its intended tasks. Note that the task the robot is performing during the establishing of the reference data, should preferably be the same as the task the robot is doing while the detection block is detecting an anomaly. Thus, via the interface device 111, the operator informs the controller 110 to execute the robot operation program to let the industrial robot operate and perform one or more tasks defined by the robot operation program 330. During operation of the robot, the robot controller 110 receives e.g. the robot joint positions, joint configuration, joint velocity, Tool Center Point force-torque measurements, joint current, time in node, etc. Note that some of the robot operation parameters are calculated by the robot controller based on received robot operation parameters or based on internal values available to the robot controller from the industrial robot 101. The anomaly detection block 301 then evaluates the received joint positions and velocities relative to a representation of the reference data 860 to detect an anomaly. An anomaly may in this embodiment be detected if e.g. joint position and/or velocities diverges from the reference data. The computational calculations associated with the anomaly detection is performed by the processor 222.

A representation of the reference data may either be the reference data itself or information derived therefrom such as information that represents the normal data. An example of information derived from the reference data could be one or a series of values representing on robot operation parameter that has been established based on a plurality of values of the robot operation parameter. In this way an average value of a plurality of values of one robot operation parameter may be derived and used for the anomaly detection. Hence, in this document, when referring to using reference data to detect an anomaly it should be understood as either the reference data itself or information derived from the reference data.

Optionally, when the anomaly detection block 334 detects an anomaly, the anomaly detection block 334 may issue an anomaly output information. The anomaly output information may be provided to the interface device 111 to inform an operator of the anomaly.

Optionally, the anomaly output information may comprise an anomaly response. The response may be provided to an anomaly response block (not shown) of the controller, which may instruct the robot arm 101 to act as instructed by the anomaly response.

In the following is non-limiting examples of use the output from the anomaly detection block. 1) the output of the anomaly detection block can be used to create a heat map of the robot program which can indicate which parts of the robot's program tree that are anomalous, 2) the output of the anomaly detection block can be used to indicate when to service the robot or its environment, 3) in addition to 2), the anomaly detection block can be incorporated into a predictive maintenance module to predict when to service the robot or its environment—e.g. there might be a correlation between the number of detected anomalies and the remaining useful lifetime, and 4) the output of the anomaly detection block can be used to gain general insight of which robot program elements that often leads to anomalous events.

As mentioned above, the present invention relates to detection of anomaly by means of the robot controller 110. For the robot controller 110 to be able to detect such anomaly, reference data needs to be collected during the execution of the robot operation program 330. Several different methods can be used to perform the anomaly detection and which is the best to some extend depends on the nature of the input data i.e. the collected data which also sometimes are referred to as robot operation parameters.

Figure 12:
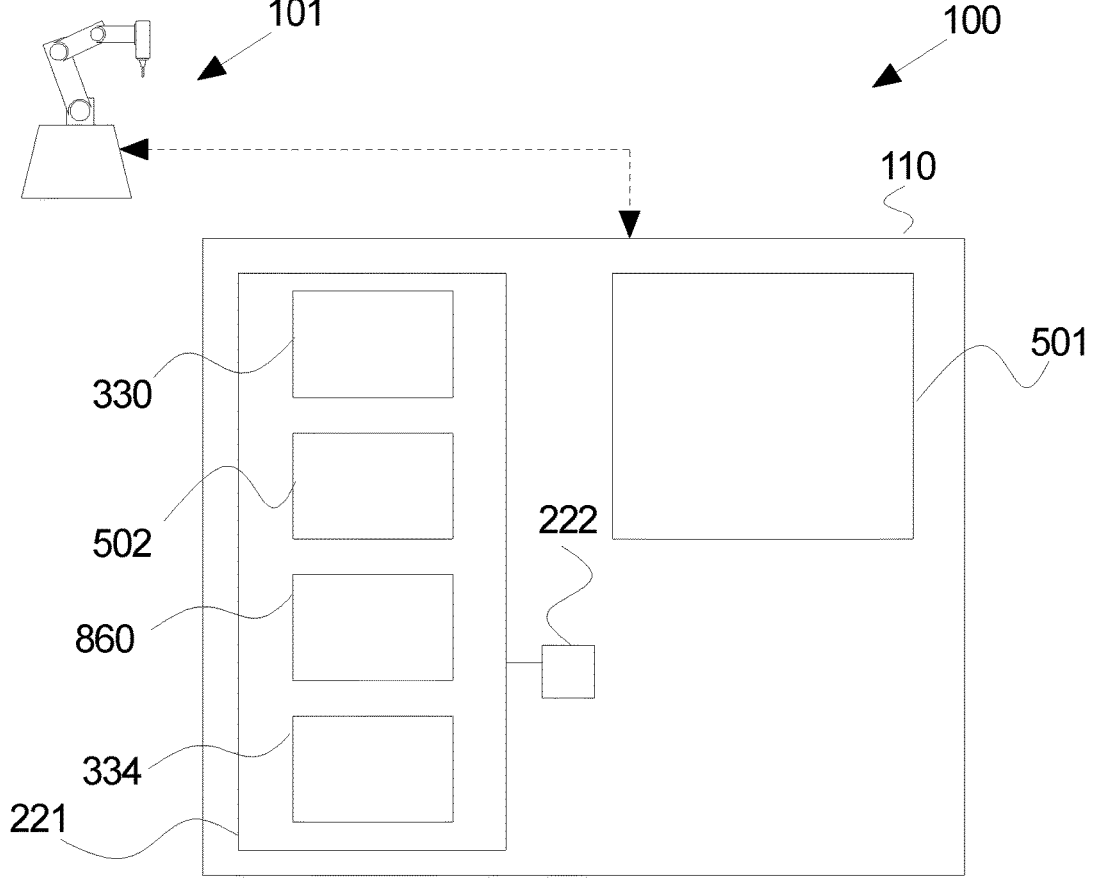
FIG. 12 illustrates a robot controller according to an embodiment of the present invention.

FIG. 12 illustrates a robot system 100 comprising a real-time data exchange (RTDE; Real-Time Data Exchange) interface 501 and a controller 110 comprising a processor 222 a robot operation program 330, an anomaly detection block 334, reference data 860, and a pre-processing block 502 some or alle of this stored on a memory 221. The RTDE interface is typically part of the robot controller and used to access the robot controller from external computers, controllers, servers, etc.

The pre-processing block 502, comprises a number of pre-processing sub-blocks, which performs different pre-processing operations, as will be described below. The real-time exchange block 501, receives robot operation parameters from the industrial robot. A pre-processing operation could be to perform standardization to ensure that all features have similar dynamical ranges. Another pre-processing operation could be to perform compensation on some features to reduce sensor measurement errors.

Through the real-time data exchange interface 501, the robot operation parameters are available and updated by the RTDE interface at a sample frequency 50 Hz and 1 KHz such as e.g. 500 Hz. The sample frequency depends on the amount of data that is needed for the anomaly detection. Further, if low frequent or high frequent anomalies are expected, the sample frequency can be adjusted accordingly. Also, it depends on the number of different robot operation parameters that have to be analyzed and to some extend also the anomaly detection method chosen. Hence, the range in which the sample frequency is chosen may be broader than between 50 Hz and 1 KHz dependent on the individual robot system and anomaly detection hereof.

In this exemplified embodiment, the RTDE interface 501 offers up to a total of 251 robot operation parameters, which may be provided as output to the anomaly detection block 334 via the pre-processing block 502. Each of these outputs might provide valuable insight into the robot's operation, while others might be redundant. The available outputs from the RTDE interface are a combination of sensor readings, I/O registers, and status registers.

Suppose the RTDE interface samples each of the 251 robot operation parameters at a frequency of 500 Hz, then it would sample approximately 7.6 MB/s, which would lead to a disadvantageously large amount of data to be handled by the robot controller. To limit the amount of data, the output from the RTDE interface may be sampled at a frequency of 100 Hz, since the operation anomalies, e.g. the exogeneous anomalies, are of a lower-frequency nature. Furthermore, in this example, only a subset of the 251 robot operation parameters is provided to the anomaly detection block to limit the load on the processor and memory of the robot controller.

As the sample frequency may vary from the mentioned 100 Hz and 500 Hz, the number of robot operation parameters may also vary from the mentioned 251. Among the most relevant robot operation parameters (i.e. providing most relevant information of an anomaly) are tool center point force-torque data, timestamps, and joint data, such as joint configuration, joint velocity and joint current.

Optionally, the RTDE interface 501 may provide robot operation parameter directly to the anomaly detection block 334, in implementations of the invention where pre-processing is not required. An example hereof is if e.g. the anomaly detection block utilizes a neural network, which does not require pre-processing of robot operation parameters.

The pre-processing block 502 receives the robot operation parameters sampled at the real-time exchange block 501, pre-processes the data according to the pre-processing sub-blocks, and outputs the pre-processed robot operation parameters. The pre-processed robot operation parameters are then used to establish the reference data as previously described. Then, during operation of the robot, the pre-processed robot operation parameters is received by the anomaly detection block 334 from the pre-processing block 502, and the anomaly detection block 334 performs anomaly detection based on the pre-processed robot operation parameters, with reference to the reference data established based on robot operation parameters which may also be pre-processed.

Based on user selection, one or more of the above mentioned pre-processing sub-blocks can be applied to both the robot operation parameters used to establish the reference data prior to e.g. a training of any of the anomaly detection methods, and to the robot operation parameters that is sampled during e.g. daily operation of the robot and utilized to detect an anomaly with reference to the established reference data.

Pre-processing both the reference data and the robot operation parameters sampled during operation of the robot system with the same pre-processing regime may advantageously increase accuracy of the anomaly detection.

The pre-processing may comprise a step of standardization of the robot operation parameters. Standardization may be required since different robot operation parameters may vary largely in their ranges and they may also be obtained in different measurement units. These differences in the ranges of initial robot operation parameters (features) may cause trouble to the anomaly detection models, including the above-mentioned learning-based models. E.g. when utilizing a model based on distance computation; if one of the robot operation parameters (features) has a broad range of values, the distance will be governed by this particular feature. In other words, the feature with the bigger values will have bigger impact to the distance calculation compared with features with smaller values. According to the invention, this problem can be overcome by standardization of the robot operation parameters, prior to anomaly detection. Preferably, the reference data should follow the same pre-processing steps, and therefore should also be standardized if the robot operation parameters sampled during operation of the robot is standardized.

Various approaches to standardization of the robot operation parameters can be applied. In this example, standardization is done by calculating a z-score for each of the robot operation parameters.

The standardization is performed by using a mean and standard deviation derived from said reference data and one based on normalization using minimum and maximum values derived from said reference data. Here the standardization is performed as a category-wise standardization, calculating a shared mean and standard deviation for all features belonging to the same category of the obtained data. This means that e.g. data obtained related to joint current share a single mean and standard deviation:

$$x'_j = \frac{x_j - \hat{\mu}_{c(j)}}{\hat{\sigma}_{c(j)}}$$

where ûc(j) is the shared mean for all features belonging to category c(j) and O^c(j) is the shared standard deviation for all features belonging to category c(j).

Alternatively, standardization may comprise other methods and measures of variation in data, which may also be suitable for the present invention. Nonlimiting examples includes, but is not limited to, techniques such as inter-quartile range (IQR) and median absolute deviation (MAD). Advantageously, these methods can be utilized to achieve more robustness against e.g. outliers in the data, and therefore be more suitable in implementations of the invention, where the robot operation parameters are contaminated by a lot of noise.

As an alternative to the category-wise standardization, it is also possible to use normalization methods based on approximate minimum-maximum values for each feature derived from a dynamical model of the manipulator structure. Pre-processing the data using standardization is preferred over a minimum-maximum normalization for anomaly detection, since slight contamination of the normal robot operation parameters can potentially have heavy impact on the parameters when using the minimum-maximum normalization.

The choice of standardization affects the anomaly detection performance. Therefore, to obtain the best performance of the anomaly detection in a specific scenario, one or more of these techniques could be tested.

In an optional pre-processing step, the number of data instances and thereby the amount of robot operation parameters that is fed to the controller is minimized to reduce the memory and processing power that is required by the controller 110 to train the anomaly detection model and to perform the anomaly detection. This pre-processing step utilizes redundancy in the robot operation parameters.

During training and during anomaly detection, the models can be allowed to use all available data instances (input data). Redundancy may occur in the robot operation parameters with regards to anomaly detection, and thereby, the anomaly detection models operated by the anomaly detection block of the robot controller may potentially have access to more data than necessary.

Different types of dimensionality reduction methods may be applied to reduce the size of the input data (the robot operation parameters), and thereby reduce the processing power and memory requirements that needs to be allocated for anomaly detection. Reducing processing power and memory requirements may prolong the processor and memory and also insure more stable execution of the robot program. The controller is thus capable of controlling both the operation of the robot, as well as anomaly detection, without requiring large, expensive processors that also disadvantageously produces a lot of heat.

Furthermore, dimensionality reduction may advantageously remove noise from the robot operation parameters, and furthermore diminish the problem of overfitting a model used for anomaly detection, which could lead to poor anomaly detection. An additional advantage of dimensionality reduction is that it shortens the training time of the anomaly detection models.

Specific non-limiting examples of dimensionality reduction methods that may be applied according to the invention includes linear methods such as principle component analysis and linear discriminant analysis, and non-linear dimensionality reduction methods such as e.g. kernel principle component analysis. Depending on the specific implementation of the invention, other dimensionality reduction methods and/or combinations of dimensionality reduction methods may be applied.

Advantageously, on very high-dimensional datasets comprising large amount of robot operation parameter data, dimensionality reduction may improve the robot controllers anomaly detection accuracy and/or boost performance of the anomaly detection, while at the same time ensuring stable operation of the robot system/robot arm.

The anomaly detection performed by the anomaly detection block 334 of the robot controller 110 according to the invention may be implemented in various ways. One way is using an instance-based anomaly detection method including e.g. local outlier factor (LOF), which performs robustly across many introduced anomalies. Instance-based methods, however, demands a lot of processing power and/or data memory in order to function. Typically, more than one giga byte of memory is required, and therefore these methods are not necessarily well suited for running on a robot controller, whereas they can be used for anomaly detection using separate controllers comprising more memory and/or processing power.

To mitigate the problems of the instance-based methods such as local outlier factor, preferable implementations of the invention may utilize autoencoders, capable of performing anomaly detection using the robot controller, while leaving enough memory and processor power to enable the robot controller to continue control of robot operation.

The robot system according to the present invention may comprise an industrial robot is a robot arm comprising a plurality of robot joints connecting a robot base to a robot tool flange as described above, an autonomous mobile robot or similar. Both robot arms and autonomous mobile robots may be used in collaborative environments, where such robots are prone to exposure of anomalies. Thus, anomaly detection is advantageous for such robots.

It should be mentioned that the robot operation parameters may be based on external operation parameters. External operation parameters may for example be data from an external sensor which provides external sensor data. An external sensor may be understood as a sensor or sensor unit which is not integrated in or built into the industrial robot or robot controller. Examples of external sensors are vision systems, external proximity detectors, external force sensors, etc. Using external operation parameters may permit additional flexibility or more detailed anomaly detection.

The robot controller may be configured to control operation of said industrial robot based on said internal operation parameters such as joint data including joint configuration, joint velocity, joint current, etc. Further, the internal operation parameters may comprise tool center point force-torque data, program node ID, etc.

Note that both position and velocity of a robot may be derivable from joint data. Thus, joint data may advantageously indicate anomalies. For a six-axis robot, the joint data may thus for example comprise six joint configurations, six joint velocities and six joint currents. However, note that anomaly detection can be performed without utilizing all joint data. Further note that joint currents may also be referred to as motor currents. And joint configurations may also be referred to as joint angles, or positions of the output flanges. Further note that Force-torque data of the tool may advantageously indicate collisions of the tool with surroundings. In robot compliance mode where a robot arm is configured to apply a predetermined force to an object, the force-torque data can also be used to detect anomalies in the applied force. Further noted that having a program node ID may aid to clearly characterize and identify a program node, for example if an anomaly is detected in that node. A program node ID may also be used for detection of anomalies, e.g. an abnormal sequence of program node IDs may indicate an anomaly.

It should be mentioned that the respective program nodes may form a linear program structure.

The respective program nodes may comprise one or more robot movement nodes. The one or more movement nodes comprises one or more precision movement nodes and/or one or more high-speed movement nodes.

A movement node is associated with movement of the industrial robot upon execution of this respective program node. Performing anomaly detection for movement nodes is advantageous, since movement is a typical operational element of operation of industrial robots which may be subject to anomalies such as collisions. Further, some movement may be categorized or labelled as precision movement, in which precision is particularly important. This may for example be if a robot has to move its tool near a workpiece. Since precision is particularly important for precision movement, anomaly detection is particularly important. Anomalies here may for example indicate of errors on workpieces. Further, some movement may be categorized or labelled as high-speed movement, in which high speed is prioritized. This may for example be if a robot has to be moved from one position to another. For such movement, precision may not be required, and thus, constraints or thresholds for anomaly detection may be larger, so as to not detect an overwhelming number of unimportant anomalies in which actually important anomalies are not recognized by a human operator. Furthermore, anomaly detection here may be important, since high speeds are involved, and, consequently, risk of damage to the robot and its surroundings is increased.

The respective program nodes may comprise one or more tool activation nodes, one or more waiting nodes, one or more machine tending nodes, one or more measurement nodes, etc.

During tool activation, precision is typically required. Furthermore, the types of anomalies which may occur are typically different here. Hence, having distinct constraints for program nodes relating to tool activation is advantageous. Tool activation may for example relate to welding, cutting, screwing, polishing, applying material (e.g. glue or paint), removing material (e.g. grinding), gripping (e.g. clamping or vacuum gripping), activation of measurement tool (e.g. camera or sensor) etc. Further, an operational element may consist of waiting, e.g. waiting for a workpiece to be provided to the robot, waiting for another machine to complete a task in a machine tending application, or waiting for a passage to open during product delivery. Here, a longer waiting time than usual may be indicate of an error, and hence having a waiting node with at least one distinct node condition is advantageous. Further, machine tending may involve distinct tasks such as pressing a button and/or opening/closing a door. Such tasks may be prone to unique anomalies, and hence having distinct node conditions for such nodes is advantageous. Further, some robot applications may involve performing measurements, e.g. via a camera, length measurement means, weight measurement means, temperature measurement means, or any other types of sensors. Such measurement tasks may be prone to unique anomalies, and hence having distinct node conditions for such nodes is advantageous.

The respective node condition sets may comprise at least two different node condition sets, at least two different program nodes. Note that the at least two different node condition sets may respectively be associated with the at least two different program nodes.

The node-specific parameter threshold may be established automatically or manually. A threshold may be established automatically, for example via a computer algorithm such as machine learning, or it may be established manually, for example via a user interface. Automatic establishment is advantageous since normal/anormal characteristics of multidimensional data may be difficult for humans to analyze. Nevertheless, manual establishment may also be advantageous, since it may permit a user to define constraints according to specific requirements. Embodiments may also combine automatic and manual establishment, for instance an automatic establishment may be provided whereafter a manual establishment is performed based on the automatic establishment.

The node-specific parameter threshold may be one threshold of several node-specific parameter thresholds of a node condition set of said respective node condition sets. In other words, a particular program node may be associated with several different thresholds, which may permit improved anomaly detection.

The at least one node condition may comprise a node-specific parameter weight of said one or more robot operation parameters for said operation anomaly.

A node-specific parameter weight may be understood as a particular relative weighting of the one or more robot operation parameters which is specific for an associated program node. Weighting may also be understood as a particular selection of data, e.g. weighting a first and a second dataset with 1 and 0, respectively, corresponds to a selection of the first data set. Having node-specific parameter weight permits more detailed adjustment of individual node condition sets, which may improve anomaly detection. Different node condition sets may comprise different node-specific parameter weights.

The node-specific reference data may be on said one or more robot operation parameters established in relation to previous execution of said respective program nodes.

The node-specific anomaly data may be based on said one or more robot operation parameters established in relation to previous execution of said respective program nodes.

The node-specific reference data may be clustered in relation to said respective program nodes using a gaussian mixture model.

The at least one node condition may comprise a Euclidian distance of said one or more operation parameters relative to said node-specific reference data.

The node-specific machine learning may be based on said node-specific reference data.

In an embodiment of the invention, said at least one node condition is based on an anomaly occurrence number.

In an embodiment of the invention, detection of said operation anomaly is based on a collective anomaly occurrence number associated with several of said respective program nodes.

In some embodiments, a smaller number of weak anomalies may be acceptable, or even normal, during operation. However, a large number of such weak anomalies may be indicative that an error is occurring. Weak anomalies may be then summed to establish an anomaly occurrence number, and an operation anomaly may be characterized as the anomaly occurrence number exceeding an anomaly occurrence threshold.

An anomaly occurrence number may be related to weak anomalies in one, several, or all of said respective program nodes. Further, embodiments may simultaneously provide anomaly detection via anomaly occurrence number exceeding an anomaly occurrence threshold, and through other operation anomalies which are not detected via an anomaly occurrence number exceeding an anomaly occurrence threshold.

In an embodiment of the invention, said at least one node condition is based on comparing said one or more robot operation parameters with a node-specific representation of said node-specific reference data.

The at least one node condition may be based on comparing said one or more robot operation parameters with said node-specific parameter threshold and/or is based on said node-specific representation of said node-specific reference data. A node-specific representation of reference data may also be understood as a representation of node-specific reference data. A representation may for example be a fit, a representative model distribution, an artificial neural network representing properties of the reference data, or some other representation. A representation of reference data may also be the reference data itself. Utilizing representations of said reference data may enable faster processing and reduced requirements to the reference data itself, which is advantageous.

The node-specific parameter threshold of one of said one or more high-speed movement nodes of said respective program nodes may be larger than a node-specific parameter threshold of another of said respective program nodes. In relation to thresholds, larger and smaller may be understood relatively or absolutely. Typically, larger deviations from a desired movement trajectory may potentially be acceptable for high-speed movement, and hence having a larger threshold for such a program node is advantageous.

The node-specific parameter threshold of one of said one or more precision movement nodes of said respective program nodes may be smaller than a node-specific parameter threshold of another of said respective program nodes. Typically, larger deviations from a desired movement trajectory are not acceptable for precision movement, and hence having a smaller threshold for such a program node is advantageous.

The node-specific parameter threshold of one of said one or more tool activation nodes may be related to said tool center point force-torque data.

The node-specific parameter weight of said tool center point force-torque data may be larger or smaller in one of said tool activation nodes than in another of said respective program nodes.

In an embodiment of the invention, said node-specific parameter threshold of one of said one or more tool activation nodes of said respective program nodes may be larger or smaller than a node-specific parameter threshold of another of said respective program nodes.

During tool activation, it may be particularly important that the tool is applied correctly (e.g. to a workpiece), and hence having a smaller threshold or weight of tool center point force-torque data during tool activation is advantageous.

While the tool is activated, a force and/or a torque may intentionally be applied to the tool, whereas during other nodes (e.g. movement), no force or torque is applied to the tool. A detection of an even a small deviation of the tool center point force-torque data in other program nodes than a tool activation node may thus indicate a collision. Hence, having a larger threshold or weight of tool center point force-torque data during tool activation is advantageous.

The anomaly detection block may be integrated in said robot controller.

By integrating the anomaly detection block in the robot controller, additional external anomaly units are circuitry may be avoided, which is advantageous. It may further simplify installation.

The robot controller may obtain said robot operation parameters during operation of said industrial robot.

By obtaining the operation parameters by the robot controller, external measurement units or circuitry may be avoided which is advantageous. If robot operation parameters are obtained or measured by a robot controller with an integrated anomaly detection block, the operation parameters may be directly provided to the anomaly detection block within the robot controller, which is advantageous. It may for example reduce the need for communication with external units or reduce delays due to communication.

The robot system may be configured to perform an emergency safety stop.

Robots for collaborative operation may preferably comply with certain ISO standards (e.g. ISO 10218-1), which specify standards for such collaborative operation (i.e. without safety guards between the robot and the operator). If a parameter limit is exceeded, an emergency safety stop is issued to protect the environment of the robot.

The emergency safety stop and the anomaly detection may be two separate functionalities which function independently of each other. In contrast, the anomaly detection block may not necessarily issue an emergency safety stop.

The emergency safety stop may for example be facilitated by the robot controller, which monitors powers, currents, and/or forces to stop the industrial robot accordingly. An example of a parameter limit is a force of 50 Newton. In some embodiments, at least some operation anomalies may correspond to applying a force to a robot arm which is below 50 Newton. It is to understood stat 50 Newton is just an example of a parameter limit. A parameter limit in the context of safety may also relate to one or more of power, momentum, elbow speed, elbow force, tool speed, etc.

Upon occurrence of an operation anomaly, an emergency stop is typically not necessary. Instead, an operator/user may for example be notified, and the operator can then assess whether further actions are necessary.

It should be noted that detection of said operation anomaly may not halt operation of said industrial robot.

The robot system may further comprise an emergency safety stop block configured to monitor the operation of said robot system and to perform said emergency safety stop.

The method may further comprise a step of modifying said at least one node condition based on said one or more robot operation parameters established in relation to previous execution of said respective program nodes.

Thus, anomalies may be detected based on comparison across multiple robot operation cycles. Thus, smaller errors gradually introduced may be easier identified, or, alternatively, the node conditions may be regularly adjusted to changing working conditions of the robot system.

The method may comprise a step obtaining node-specific reference data based on previous executions of at least some of said respective program nodes, wherein at least one of said at least one node condition is based on said node-specific reference data.

The at least one node condition may be established based on machine learning.

The establishment of reference data (or a representation thereof) and particularly the node condition may optionally be based on machine learning. Optionally, one node condition is based at least partly on machine learning, whereas another is not.

The step of obtaining node-specific reference data may be performed as a separate session.

Having a separate session may permit monitoring operation, thus ensuring that no anomalies occur, or that if anomalies occur, the reference data is sorted or labelled accordingly. A separate session may for example be performed as part of installation, integration, training, or reconfiguration of a robot system. Node-specific reference data may be obtained from executions of an entire robot operation program, or just some parts/nodes. Thus, data established for some nodes can be recycled if other nodes are changed. Similarly, a separate session may optionally be restricted to execution of certain operational elements.

The step of obtaining node-specific reference data may be supplemented by establishing further node-specific anomaly data by exposing said industrial robot to one or more intentional operation anomalies, wherein at least one of said at least one node condition may be based on said node-specific anomaly data Such exposure may involve labelling data obtained in relation to the robot undergoing the intentional operation anomalies. The intentional anomalies may for example be exogenous anomalies but are not restricted to this. Examples of intentional anomalies include are applying force to arm, applying force to tool, removing object, changing object (size, shape, weight), changing position of object, changing wait time, etc.

The method comprises a step of encoding and decoding at least a subset of said robot operation parameters in preparation to said step of comparing said at least one node condition, wherein said step of encoding and decoding is performed by an autoencoder which is established based on said node-specific reference data.

In an embodiment of the invention, at least one of said at least one hidden layer has fewer neurons than said input layer and said output layer.

The one or more hyperparameters of said neural network may be optimized based on said one or more intentional operation anomalies. A hyperparameter may be understood as a parameter whose value is used to control the learning process. Examples of hyperparameters are size of parts of the neural network (e.g. input layer, output layer, hidden layer, number of hidden layers) and topology of the neural network (connections between layers).

The node-specific reference data may be clustered based on a machine learning algorithm.

The method may further comprise a step of establishing said at least one node condition based on clustering of said node-specific reference data by said machine learning algorithm.

The method may further comprise a step of establishing said respective program nodes based on clustering of said node-specific reference data by said machine learning algorithm. Clustering of data may for example serve as an advantageous starting point for establishment of node conditions or for defining the node conditions (e.g. does robot operation parameters lie outside or inside a cluster?). Alternatively, the nodes may even be defined based on clustering of reference data. The clustering may for example be performed via a gaussian mixture model.

The anomaly notification may comprise an auditory notification.

The anomaly notification may comprise a visual notification.

By providing an anomaly notification to a user, the user can assess whether it is necessary to interrupt operation of the industrial robot, or whether to let it carry on, which is advantageous. The anomaly notification may for example be in the form of a visual and/or an auditory message or alarm, e.g. via speakers or lights in connection with the robot system. It may also be provided to a user interface, for example a user interface in connection with the robot controller. It may also or alternatively be provided via an internet connection, or other long-range communication means. The anomaly notification may be accompanied by various useful information such as video of the robot system recorded around the time of the occurrence of the anomaly, data (e.g. robot operation parameters), characterization of the anomaly etc.

The method may comprise a step or reconfiguring said robot control program based on said operation anomaly.

The step of reconfiguring said robot control program may comprises reconfiguring the program node of said respective program nodes in which said operation anomaly occurred. If an anomaly has occurred, and particularly if a similar anomaly has occurred repeatedly, it may be advantageous to reconfigure the control program to potentially reduce the risk of such an anomaly occurring again. In this context, reconfiguring may for example be understood as reprogramming.

The method may comprise a step of classifying said operation anomaly. Various potential classifications are at least: collision anomaly, missing workpiece anomaly, long wait anomaly, weight anomaly, size anomaly, displaced workpiece anomaly, exogenous anomaly, force/torque anomaly, dropped workpiece anomaly, position anomaly, vibration anomaly (e.g. provided based on at least one accelerometer), and endogenous anomaly. Such classification may for example be based on supervised machine learning, in which a user labels various anomalies upon which a neural network is trained.

The computer program may be configured to be carried out by the method describe in this document.

From the above, it is now clear that the invention relates to a robot system and a method detection of an operation anomaly. The anomaly detection can be based on a learning-based anomaly detection method e.g. in combination with pre-processing of robot operation data/parameter, feature selection, etc. as described above. By segmenting anomaly detection into condition sets which relate to separate program nodes, it is possible to tailor anomaly detection to a specific application, and to provide useful anomaly information upon which a robot operation program may be further optimized. Note that the above-described principles exemplified using robot arm may also be applied in other types of industrial robot systems, such as autonomous mobile robots.

The fact that it is the robot controller that carries out the anomaly detection is advantageous in that no additional controllers are needed. Further, since the anomaly detection is carried out on the robot controller, it is independent of the safety system of the robot i.e. no changes have to be made to the safety system of the robot that operates independent of the robot controller. Accordingly, the anomalies detected by the present invention is different from what is monitored by the safety system i.e. the robot will typically not stop operation if an anomaly is detected in contrary to the situation where the safety system detects a safety breach.

It should be mentioned, that defining one anomaly i.e. a robot operation parameter that, based on the anomaly evaluation, is defined as an outlier, does not necessary lead to changes in operation. Sometimes more than one/a plurality of outlier(s) must be detected to be able to define, that an anomaly is/has actually happened. Typically, this plurality of outliers is based on the same or related robot operation parameters or to a group of robot operation parameters that can be associated with the same anomaly.

Independent on effect on operation of the robot, the outliers may be stored locally or centrally and used for statistics to be able to picture outliers and trends across a fleet of robots. In this way it may be possible to predict future behavior of a certain type of robot e.g. during a certain type of work based on content of a central outlier database.

Further, it should be noted, that analysis of a particular feature/robot operation parameter over time i.e. over several operation cycles of the robot can be used to establish a trend for the particular feature. Such trend can be used to predict if or when a change in the particular feature will be considered an anomaly.

The invention has been exemplified above with the purpose of illustration rather than limitation with reference to specific examples of methods and robot systems. Details such as a specific method and system structures have been provided in order to understand embodiments of the invention. Note that detailed descriptions of well-known systems, devices, circuits, and methods have been omitted so as to not obscure the description of the invention with unnecessary details. It should be understood that the invention is not limited to the particular examples described above and a person skilled in the art can also implement the invention in other embodiments without these specific details. As such, the invention may be designed and altered in a multitude of varieties within the scope of the invention as specified in the claims.

BRIEF DESCRIPTION OF FIGURE REFERENCES

| | |
|---|---|
| 100 | robot system |
| 101 | robot arm, industrial robot, autonomous mobile robot |
| 102a-102f | robot joint |
| 103 | robot base |
| 104 | robot tool flange |
| 105a-105f | axis of robot joints |
| 106a-106f | rotation arrow of robot joints |
| 107 | robot tool flange reference point |
| 108 | robot base reference point |
| 109 | direction of gravity |
| 110 | robot controller |
| 111 | interface device |
| 112 | display |
| 113 | input devices |
| 114 | force torque sensor |
| 115 | acceleration sensor |
| 216a; 216b; 216f | output flange |
| 217a; 217b; 2179f | joint motors |
| 218a; 218B, 218f | output axle |
| 219a; 219b; 219f | joint sensor |
| 220a-220f | joint sensor signal |
| 221 | memory |
| 222 | processor |
| 223a, 223b, 223f | motor control signals |
| 224 | force signal |
| 225 | acceleration signal |
| 330 | robot operation program |
| 331 | respective program node |
| 332 | respective node condition set |
| 333 | node condition |
| 334 | anomaly detection block |
| 335 | robot operation parameter |
| 336 | operation anomaly |
| 337 | node-specific sub-block |
| 338 | emergency safety stop block |
| 640 | machine learning algorithm |
| 641 | normal operation cycle |
| 642 | anomality operation cycle |
| 751 | training input |
| 752 | model optimizer |
| 753 | model training |
| 754 | model hyperparameters |
| 755 | scoring function |
| 756 | objective computation block |
| 757 | hyperparameter optimizer |
| 758 | output log |
| 860 | reference data |
| 861 | anomaly data |
| 862 | push scenario joint motor current data |
| 863 | normal operation scenario joint motor current data |
| 864 | joint current anomaly |
| 970 | input layer |

-continued

| 971 | latent layer |
| 972 | output layer |
| 973 | hidden layers |
| 974 | input portion |
| 975 | latent portion |
| 976 | output portion |
| 977 | posterior distribution |
| S1-S11 | Method steps |
| 501 | Real-time exchange block |
| 502 | Pre-processing block |

The invention claimed is:

1. A system comprising:

an industrial robot;

a controller configured to control operation of the industrial robot;

memory storing an operation program that is executable by the controller to operate the industrial robot according to a cycle, the cycle comprising operations to be performed by the industrial robot;

wherein the operation program comprises program nodes, each of the program nodes being associated with a respective operation;

wherein the controller is configured to obtain reference data corresponding to one or more parameters associated with execution of the operation program, wherein the controller is configured to obtain the reference data by processing one or more values of the one or more parameters obtained over previous cycles of the industrial robot; and an anomaly detector configured to evaluate, based on the reference data, one or more values of the one or more of the parameters obtained during the cycle to detect an anomaly associated with operation of the industrial robot.

2. The system of claim 1, wherein each of the program nodes is associated with a respective node condition set, each node condition set specifying a condition associated with a respective node and being based on the reference data.

3. The system of claim 2, wherein the anomaly detector is configured to compare a condition associated with a node to the one or more parameters to detect the anomaly.

4. The system of claim 1, wherein the controller is configured to obtain the reference data during a training session of the industrial robot.

5. The system of claim 1, wherein two or more sets of the reference data are obtained based on a single execution of the operation program; and wherein at least one of the two or more sets of reference data is associated with abnormal values of one or more of the parameters.

6. The system of claim 1, wherein the anomaly detector is configured to implement a machine learning process to detect the anomaly, the machine learning process comprising one of: supervised machine learning, unsupervised machine learning, semi-supervised machine learning, or reinforcement learning.

7. The system of claim 1, wherein the controller is configured to display a user interface, the user interface showing a program node at which the anomaly occurred.

8. The system of claim 1, wherein the one or more parameters are based on internal operation parameters of the industrial robot.

9. The system of claim 8, wherein the internal operation parameters comprises a timestamp.

10. The system of claim 8, wherein the internal operation parameters comprise a time associated with a program node.

11. The system of claim 1, wherein at least one parameter of at least one of the program nodes is exempt from evaluation performed by the anomaly detector.

12. The system of claim 1, wherein at least some of the program nodes form a decision tree comprising branches; and wherein different ones of the program nodes are located on different branches of the decision tree.

13. The system of claim 1, wherein the program nodes comprise one or more hybrid nodes, wherein each of the one or more hybrid nodes relates to at least two operations to be performed by the industrial robot, the at least two operations comprising: movement, tool activation, waiting, machine tending, or measurement.

14. The system of claim 2, wherein at least one node condition set comprises a first node condition set and a second node condition set;

wherein at least one node condition in the first node condition set is different from at least one node condition in the second node condition set;

wherein the anomaly detector is configured to compare the at least one node condition in the first node condition set with one or more values of the one or more of the parameters wherein the anomaly detector is configured to compare at least one node condition in the second node condition set with one or more values of the one or more of the parameters; and wherein a first program node associated with the first node condition set and a second program node associated with the second node condition set are different.

15. The system of claim 14, wherein the at least one node condition in the first node condition set or in the second node condition set comprises a node-specific parameter threshold.

16. The system of claim 14, wherein the at least one node condition in the first node condition set or in the second node condition set is based on node-specific reference data; and wherein the node-specific reference data is based, at least partly, on previous normal operation of the industrial robot.

17. The system of claim 14, wherein the at least one node condition in the first node condition set or in the second node condition set is based on node-specific anomaly data; and wherein the node-specific anomaly data is based, at least partly, on previous abnormal operation of the industrial robot.

18. The system of claim 14, wherein the at least one node condition in the first node condition set or in the second node condition set is based on node-specific machine learning.

19. The system of claim 15, wherein the node-specific parameter threshold of a node that is a waiting state is based on a time threshold.

20. A method for detecting an anomaly in operation of an industrial robot, the method comprising:

executing an operation program on a controller to control operation of the industrial robot according to a cycle, the cycle comprising operations to be performed by the industrial robot, the operation program comprising program nodes, each of the program nodes being associated with an operation;

obtaining reference data based on parameters associated with execution of the operation program, wherein the reference data is obtained by processing values of the one or more parameters obtained over previous cycles of the industrial robot; and using an anomaly detector to evaluate, based on the reference data, one or more values of the one or more of the parameters obtained during the cycle to detect the anomaly.

21. The method of claim 20, wherein the industrial robot is part of a robot system comprising the controller, the anomaly detector, and memory storing the operation program.

22. The method of claim 20, further comprising:

obtaining node condition sets, wherein each of the node condition sets specifies at least one node condition associated with a respective program node; and the anomaly detector comparing, for each respective program node, at least one node condition with the one or more values of the one or more of the parameters;

wherein the anomaly is detected based on the comparing.

23. The method of claim 20, wherein the anomaly is an exogenous operation anomaly.

24. The method of claim 20, further comprising:

training a neural network based on the reference data to obtain at least one of the node conditions.

25. The method of claim 24, wherein the neural network is at least a part of an autoencoder; and wherein the autoencoder comprises an input layer, an output layer, and at least one hidden layer connecting the input layer and the output layer.

26. The method of claim 22, further comprising:

modifying at least one node condition based on at least one value of one of the parameters.

27. The method of claim 20, further comprising:

providing a notification to a user indicating that the anomaly has been detected.

28. The method of claim 27, wherein the notification identifies one or more program nodes in which the anomaly was detected.

29. The method of claim 27, wherein the notification identifies least one node condition associated with the anomaly.

30. The method of claim 27, further comprising:

providing a heat map with the notification, the heat map identifying a position of a program node and containing gradation corresponding the anomaly.

31. One or more non-transitory machine-readable storage media storing instructions that are executable by one or more processing devices to detect an anomaly in operation of an industrial robot, the instructions being executable to perform operations comprising:

comparing at least one node condition of a program node to reference data obtained by processing one or more values of one or more parameters relating to operation of the industrial robot, wherein the one or more values of the one or more parameters are obtained by executing the program node over previous cycles of the industrial robot, where each cycle comprises the same operations to be performed by the industrial robot;

wherein the at least one node condition is specified in a node condition set associated with the program node; and detecting the anomaly based on the comparing operation.

32. The system of claim 1, wherein the anomaly detector is part of the controller.

33. The system of claim 1, wherein the anomaly detector is separate from the controller.

* * * * *